US007062705B1

(12) United States Patent
Kirkwood et al.

(10) Patent No.: US 7,062,705 B1
(45) Date of Patent: Jun. 13, 2006

(54) TECHNIQUES FOR FORMING ELECTRONIC DOCUMENTS COMPRISING MULTIPLE INFORMATION TYPES

(75) Inventors: Michael Kirkwood, San Francisco, CA (US); Sima Yazdani, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 662 days.

(21) Appl. No.: 09/909,108

(22) Filed: Jul. 18, 2001

Related U.S. Application Data

(60) Provisional application No. 60/252,378, filed on Nov. 20, 2000.

(51) Int. Cl.
*G06F 15/00* (2006.01)

(52) U.S. Cl. ............... 715/500; 715/530; 715/522; 715/501.1

(58) Field of Classification Search ........... 715/530, 715/513, 522, 501.1; 707/102, 4, 10; 713/176
See application file for complete search history.

(56) References Cited

U.S. PATENT DOCUMENTS

| | | | | |
|---|---|---|---|---|
| 5,251,314 | A | * | 10/1993 | Williams ............... 707/101 |
| 5,283,894 | A | | 2/1994 | Deran |
| 5,386,556 | A | | 1/1995 | Hedin et al. |
| 5,404,506 | A | | 4/1995 | Fujisawa et al. |
| 5,584,024 | A | | 12/1996 | Shwartz |
| 5,594,837 | A | | 1/1997 | Noyes |
| 5,644,740 | A | | 7/1997 | Kiuchi |
| 5,696,916 | A | | 12/1997 | Yamazaki et al. |
| 5,740,425 | A | | 4/1998 | Povilus |
| 5,752,023 | A | | 5/1998 | Choucri et al. |
| 5,860,073 | A | * | 1/1999 | Ferrel et al. ............. 715/522 |

(Continued)

OTHER PUBLICATIONS

Jon Anthony, "Ariadne White Paper: I-Synthesizer, Core Technology Review", Mar. 30, 2001, Version 1.1, Synquiry Technologies, Ltd, pp. 1-36.

(Continued)

*Primary Examiner*—William Bashore
*Assistant Examiner*—Quoc A. Tran
(74) *Attorney, Agent, or Firm*—Hickman Palermo Truong & Becker, LLP

(57) ABSTRACT

Techniques for forming electronic documents include storing a plurality of information types for describing how information is used. Also, a plurality of document types is stored. Each document type includes a unique set of information types. A plurality of units of information is also stored. Each unit of information is associated with an information type. A document is produced based on a particular document type having a particular set of information types, and based on a first set of units of information. Each unit of information of the first set is associated with a corresponding information type in the particular set of information types. This invention allows content to be associated with a particular use, through the information type, so that the content can be incorporated in all documents where such usage is desired. This invention also allows the enterprise to control the method of generating and presenting a particular content or information object based on its use and its temporal data, e.g., how often it is refreshed. Such control is employed in predictive caching technologies. Further, the system can allow and reference which documents or info types point to other documents or info types, thereby enabling the system to replace all affected objects and pointers when changes occur, and facilitating caching all objects that are affected by a change.

34 Claims, 15 Drawing Sheets

U.S. PATENT DOCUMENTS

| | | |
|---|---|---|
| 5,875,443 A | 2/1999 | Nielsen |
| 5,907,837 A | 5/1999 | Ferrel et al. |
| 5,924,090 A | 7/1999 | Krellenstein |
| 5,970,490 A * | 10/1999 | Morgenstern ................. 707/10 |
| 6,038,560 A | 3/2000 | Wical |
| 6,085,187 A | 7/2000 | Carter et al. |
| 6,139,201 A | 10/2000 | Carbonell et al. |
| 6,154,213 A | 11/2000 | Rennison et al. |
| 6,209,095 B1 * | 3/2001 | Anderson et al. ........... 713/176 |
| 6,230,173 B1 | 5/2001 | Ferrel et al. |
| 6,256,627 B1 | 7/2001 | Beattie et al. |
| 6,315,572 B1 | 11/2001 | Owens et al. |
| 6,324,536 B1 | 11/2001 | Rofrano |
| 6,327,593 B1 | 12/2001 | Goiffon |
| 6,349,275 B1 | 2/2002 | Schumacher et al. |
| 6,397,217 B1 | 5/2002 | Melbin |
| 6,438,540 B1 | 8/2002 | Nasr et al. |
| 6,453,312 B1 | 9/2002 | Goiffon et al. |
| 6,453,315 B1 | 9/2002 | Weissman et al. |
| 6,480,860 B1 | 11/2002 | Monday |
| 6,510,406 B1 | 1/2003 | Marchisio |
| 6,510,434 B1 | 1/2003 | Anderson et al. |
| 6,519,588 B1 | 2/2003 | Leschner |
| 6,539,374 B1 * | 3/2003 | Jung ............................. 707/4 |
| 6,539,376 B1 | 3/2003 | Sundaresan et al. |
| 6,556,982 B1 | 4/2003 | McGaffey et al. |
| 6,629,097 B1 | 9/2003 | Keith |
| 6,665,662 B1 | 12/2003 | Kirkwood et al. |
| 6,675,159 B1 | 1/2004 | Lin et al. |
| 6,735,593 B1 | 5/2004 | Williams |
| 2003/0131007 A1 | 7/2003 | Schirmer et al. |
| 2004/0034651 A1 * | 2/2004 | Gupta et al. ................. 707/102 |
| 2004/0181756 A1 * | 9/2004 | Berringer et al. ........... 715/530 |

OTHER PUBLICATIONS

Susan Mael, "Synquiry Brings Context and Merchandising to E-Commerce Sites", The Online Reporter, Apr. 23-27, 2001, Issue No. 244, pp. 1-3.

U.S. Appl. No. 09/823,819, filed Mar. 30, 2001.
U.S. Appl. No. 09/908,947, filed Jul. 18, 2001.
U.S. Appl. No. 09/925,204, filed Aug. 8, 2001.
U.S. Appl. No. 09/925,163, filed Aug. 8, 2001.

* cited by examiner

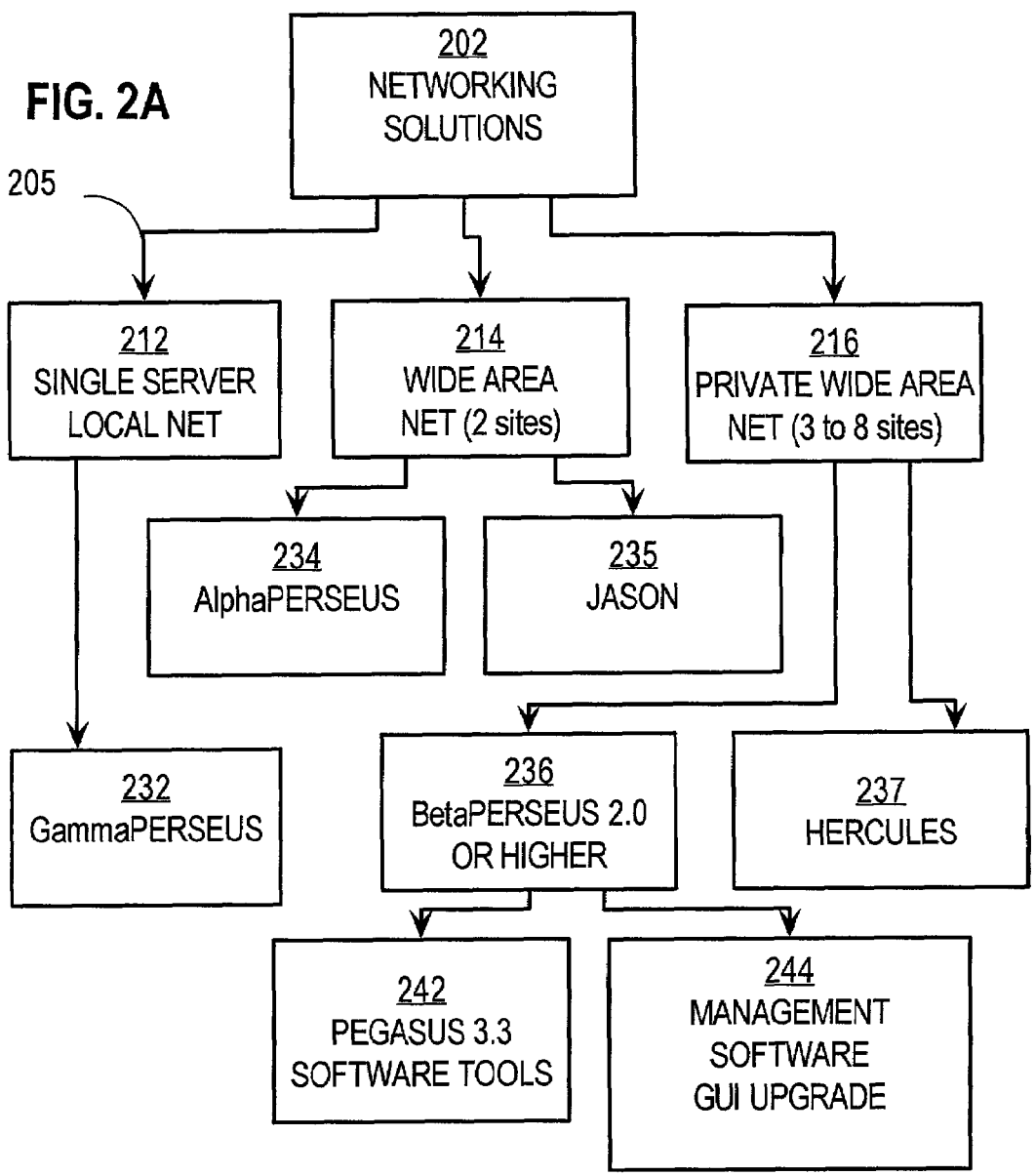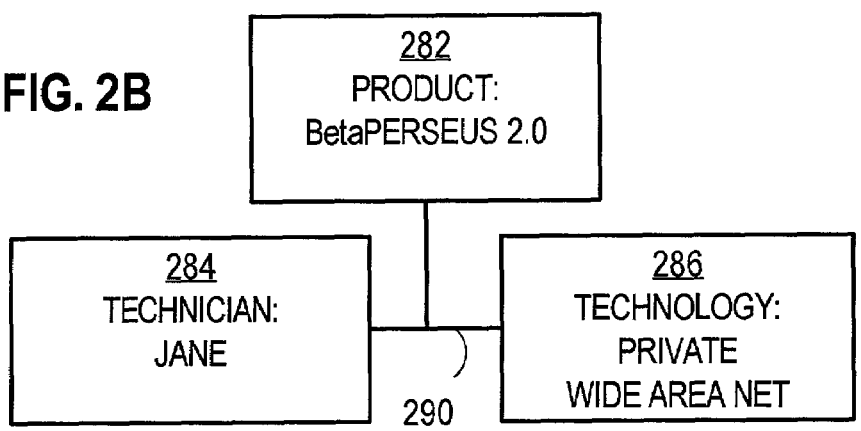

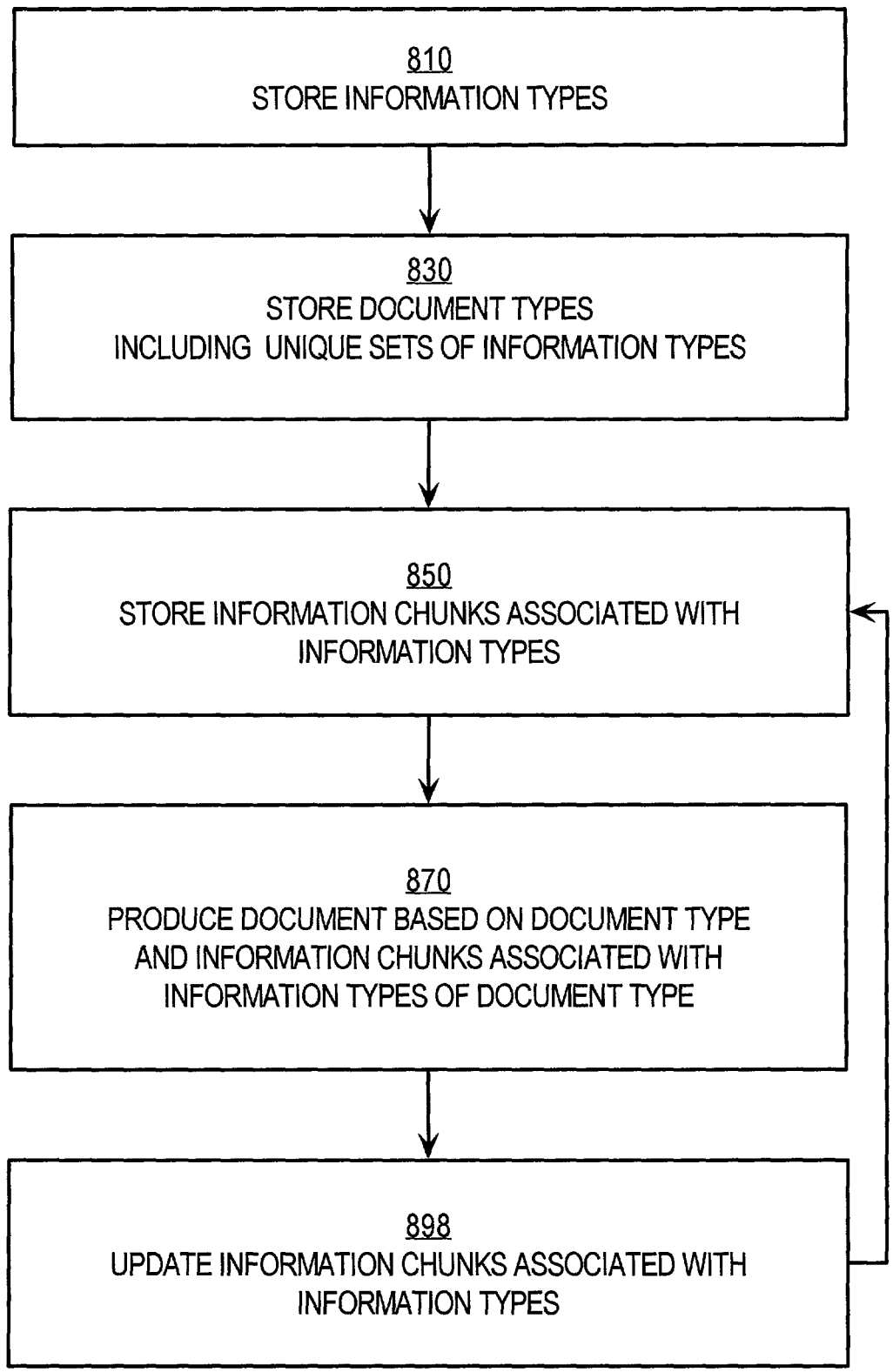

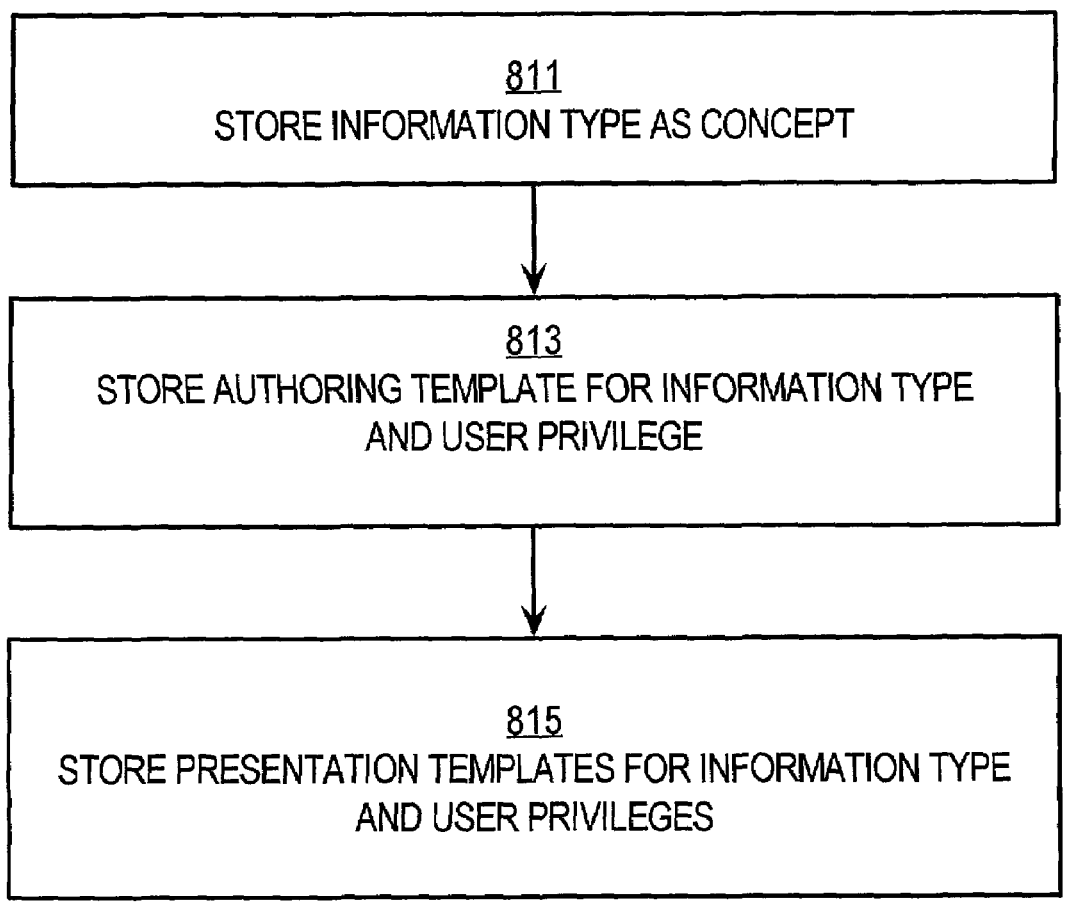

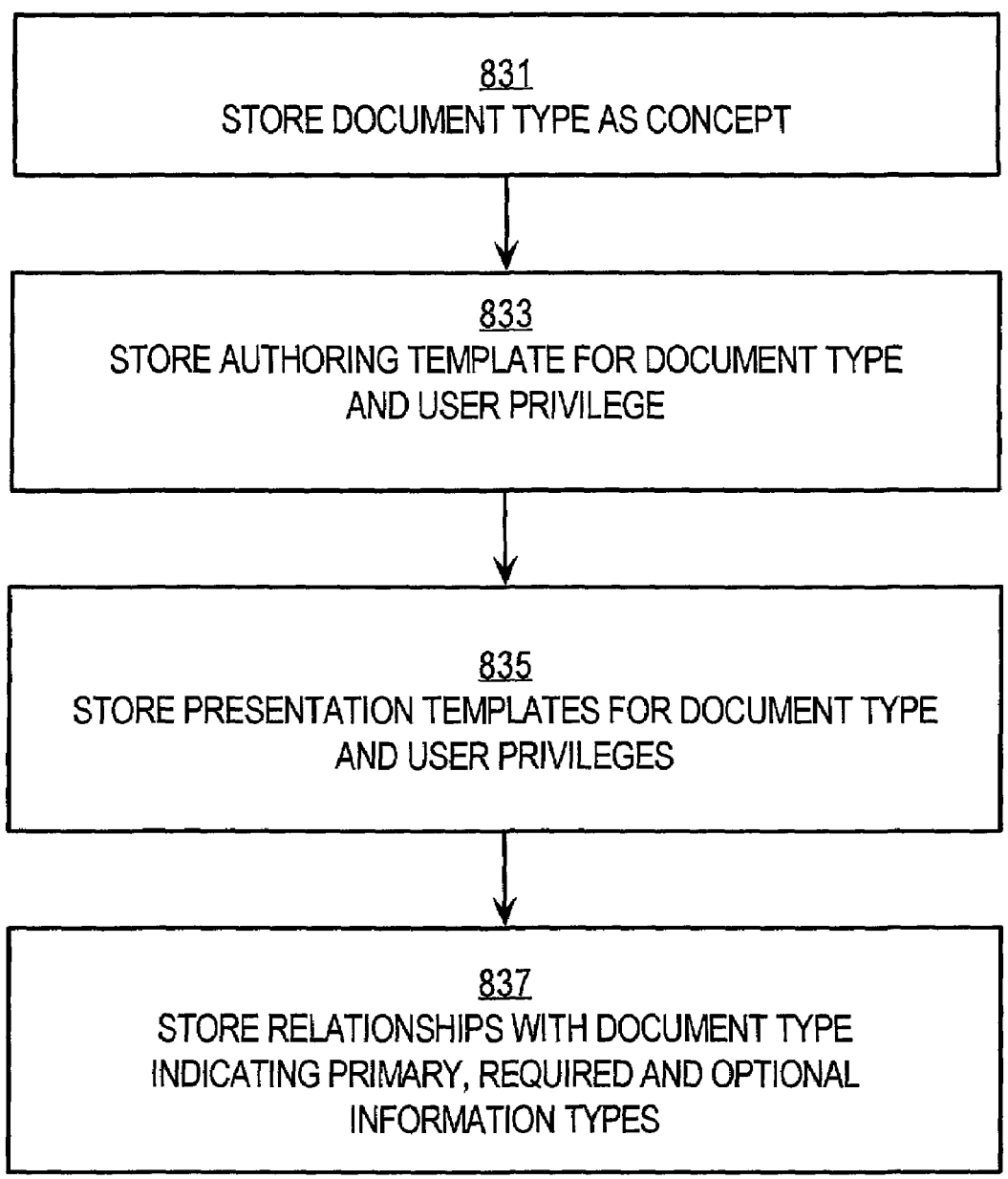

TECHNIQUES FOR FORMING ELECTRONIC DOCUMENTS COMPRISING MULTIPLE INFORMATION TYPES

CROSS-REFERENCE TO RELATED APPLICATIONS

This application is related to and claims domestic priority from prior U.S. Provisional application Ser. No. 60/252,378, filed Nov. 20, 2000, the entire disclosure of which is hereby incorporated by reference as if fully set forth herein. This application is related to prior non-provisional application Ser. No. 09/823,662, filed on Mar. 30, 2001, entitled "Query Translation System for Retrieving Business Vocabulary Terms" by inventors M. Kirkwood et al., the entire disclosure of which is hereby incorporated by reference as if fully set forth herein. This application is related to prior non-provisional application Ser. No. 09/823,819, filed on Mar. 30, 2001, entitled "Business Vocabulary Data Storage Using Multiple Inter-Related Hierarchies" by inventors M. Kirkwood et al., the entire disclosure of which is hereby incorporated by reference as if fully set forth herein. This application is related to prior non-provisional application Ser. No. 09/925,204, filed on Aug. 8, 2001, entitled "Multiple Layer Information Object Repository" by inventors M. Kirkwood et al., the entire disclosure of which is hereby incorporated by reference as if fully set forth herein. This application is related to prior non-provisional application Ser. No. 09/908,947, filed on Jul. 18, 2001, entitled "Business Vocabulary Data Retrieval Using Alternative Forms" by inventors M. Kirkwood et al., the entire disclosure of which is hereby incorporated by reference as if fully set forth herein.

FIELD OF INVENTION

The present invention generally relates to data processing in the field of electronic document creation. The invention relates more specifically to defining document types in terms of information types related to stored object information objects for producing consistent documents in any form of presentation.

BACKGROUND OF THE INVENTION

Through economic growth, mergers and acquisitions, business enterprises are becoming ever larger. Further, large business enterprises in the field of high technology now offer ever larger numbers of products and services that derive from an increasingly large variety of technologies, work processes, or sub-components thereof.

In this environment, managing the creation, use, and maintenance of the company's intellectual assets, such as products and technologies is an acute problem. As an enterprise grows, providing documentation of the enterprise products, services and activities that maintain consistent usage of names of products and services throughout the enterprise becomes even more challenging and has many different permutations. When an enterprise derives its business opportunities from research and development into new technologies or improvements of existing technologies, maintaining consistent usage of technology designations is a challenge, especially when there is disagreement or confusion about the uses, advantages or benefits of a particular technology. Such confusion can arise whether disagreements arise or not, as when there is little or no communication between different teams within an enterprise, or when the overhead involved in communicating the complexity outstrips the organization's ability.

The World Wide Web is one communication medium that exacerbates the problem, by allowing access to internal information to the enterprise's partners and customers. Large enterprises that own or operate complex Web sites, portals, or other network resources that contain product and technology information face a related problem. Specifically, ensuring consistent usage of product names, technology terms, and information objects across a large, complicated Web site is problematic. A particular problem involves maintaining consistent use of content when different parts or elements of the Web site applications or other types of documents are created by different individuals or groups, or for varying types of customers or tasks that each user is trying to accomplish.

In addition, an enterprise may want to project a planned impression to its employees, partners, customers and marketplace. Whether formal or causal, traditional or high tech, this impression is projected by the choice of words, fonts, images, audio and video. The same information presented by two different arms of the enterprise may end up projecting two different impressions. A document may be presented in different media, making more difficult the projection of a designed impression. For example, printed documents may have limitations on delivery, such as not containing audio and video clips as can a web page; documents presented on wireless devices typically do not display color and have too few pixels to display most images that can be presented on a printed page. Each of these media continues to be in flux, and systems may have to support presentation of such media using different physical devices or delivery client software.

Furthermore, the content presented to a user depends upon who the user is, or at least what role the user plays. A technical person has a different interest than a marketing person. A corporate partner expects to see more privileged content than a member of the public.

Based on the foregoing, there is a clear need for improved ways to manage one or more vocabularies of all company business practices and pertaining to all business terminology ("concept"), including but not limited to product names and technology terms.

In particular, there is a need for a way to structure stored information about those concepts so that it can be located and retrieved based on its use in various documents, by different users, regardless of who authored the information, who is generating a document that incorporates the information, and where the information resides.

Furthermore, there is a need for presenting the information retrieved in a consistent manner so the enterprise can project a designed impression to its employees, partners, customers and marketplace.

Furthermore there is a need for tailoring the presentations based on the device presenting the document.

There is also need for a system that is extensible or adaptable when new business practices, products or technologies are developed by diverse, distributed groups in a large business enterprise, and that can be shared with other enterprises, individuals, and industry standards across the business world.

SUMMARY OF THE INVENTION

The foregoing needs, and other needs and objects that will become apparent from the following description, are achieved in the present invention, which comprises, in one aspect, a method of forming electronic documents. A plurality of information types for describing how information is used is stored. Also, a plurality of document types is stored. Each document type includes a unique set of information types. A plurality of units of information is also stored. Each unit of information is associated with an information type. A document is produced based on a particular document type having a particular set of information types, and based on a first set of units of information. Each unit of information of the first set is associated with a corresponding information type in the particular set of information types. For example, documents may be produced based on a particular document type having a particular set of information types, and a series of relationships with other concepts, such as profile, geography, output, template, and any number of other concepts or attributes.

In other aspects, the invention encompasses computer readable media, and systems configured to carry out the foregoing steps.

This invention allows content to be associated with a particular use, through the information type, so that the content can be incorporated in all documents where such usage is desired. This invention also allows the enterprise to control the method of generating and presenting a particular content or information object based on its use. Such control is employed in predictive caching technologies.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2A is a block diagram that illustrates a networking solutions hierarchy including one or more concepts from the product type hierarchy of FIG. 1 according to one embodiment;

FIG. 2B is a block diagram that illustrates a non-binary relationship among concepts according to one embodiment;

FIG. 8A is flow chart illustrating a high level method for producing an electronic document according to an embodiment;

FIGS. 8B, 8C, 8D, 8E and 8F are flow charts illustrating details of some steps in FIG. 8A according to other embodiments.

DETAILED DESCRIPTION OF THE PREFERRED EMBODIMENT

Figure 1:
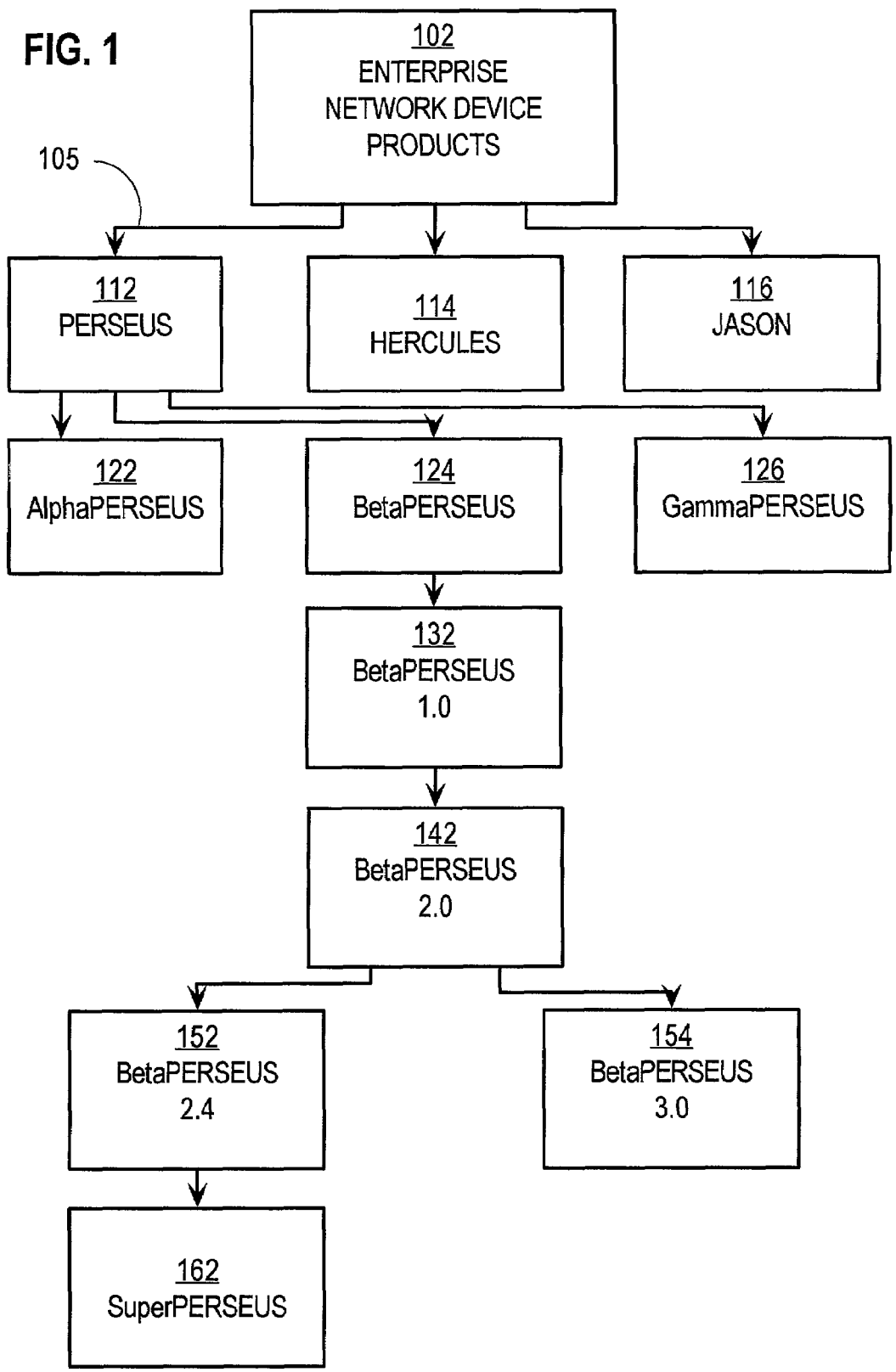
FIG. 1 is a block diagram that illustrates a hypothetical product type hierarchy according to one embodiment.

A method and apparatus for producing documents from stored information related to business vocabulary data are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

1.0 Business Vocablary Data Processing

Business vocabulary terms are used to name products, product lines, technologies, people, processes, development efforts and other business activities of an enterprise. Some of the vocabulary terms are used only internally and some are used for interaction with the public to establish brand name recognition or to support precise communication of customer interests and orders. Terms related in meaning or form are used to associate related business products and activities in the minds of the users of those terms. For example, a device sold by an enterprise might be named Perseus, after a hero of Greek mythology, and a software program for executing on that device might be named Pegasus, after the winged horse Perseus rode. Similarly, different models of the Perseus device might be called AlphaPerseus and BetaPerseus, to show they are part of the same product line, while different versions of each model may be numbered, such as BetaPerseus 2.0 and BetaPerseus 2.4.

The present invention is based in part on a recognition that the business terms of an enterprise constitute an important type of business data that should be included in the automated data processing that the enterprise performs. This vocabulary data about the products, services and activities of a business is a form of metadata for the products, services and activities of the enterprise. Those terms can be used to categorize the products, services and activities and to retrieve stored information about those products, services and activities. The data structures employed to store, retrieve and process this metadata should account for the associations in meaning and form and support rapid associative or inferential search and retrieval.

2.0 Vocabulary Development Framework

According to the present invention, the various terms that constitute the business vocabulary of an enterprise are modeled as nodes in a hierarchy called the MetaData Framework (MDF) or the Vocabulary Development Framework (VDF). In this framework, any business term that is derived from another particular business term is positioned in the hierarchy at a node that branches from the node of that particular business term from which it is derived. When the hierarchy is embodied in stored data with appropriate data structures and software programs, it is extremely useful in naming products and associating products with product lines.

For example, FIG. 1 shows a hypothetical product type hierarchy for a hypothetical enterprise that manufactures and sells network devices. In this hierarchy, node 102 is a root node representing network device products sold by the enterprise. Node 102 has three child nodes, 112, 114, 116 that are connected by arrows 105. The parent/child relationship is denoted by an arrow pointing from parent to child in FIG. 1. A relationship statement can be obtained reading from arrow head to arrow tail by the words "is a child of"

or read in the opposite direction by the words "is a parent of." Thus node 112 is a child of node 102. Node 102 is a parent of node 112. In the product type hierarchy of FIG. 1, arrow 105 represents the product type parent/child relationship.

Node 112 represents the devices named "Perseus." In this embodiment, the name of node 112 includes "Perseus." Nodes 114, 116 represent devices named "Hercules" and "Jason," respectively. FIG. 1 shows that the Perseus device comes in three models, "AlphaPerseus," "BetaPerseus" and "GamaPerseus," represented by the three nodes 122, 124, 126, respectively. The BetaPerseus model has evolved over time through versions 1.0, 2.0 and 3.0, represented by nodes 132, 142, 154, respectively. The names of these nodes are "BetaPerseus 1.0," BetaPerseus 2.0," and "BetaPerseus 3.0," respectively. BetaPerseus 2.0 also experienced some evolutions called "BetaPerseus 2.4" and "SuperPerseus," which are represented by nodes 152, 162, respectively.

This hierarchy consists of binary relationships; that is, each relationship requires one parent and one child. The product type relationships of FIG. 1 are constrained by a rule that each child may have only one parent. There is no rule restricting the number of children a parent may have in this hierarchy.

Various applications use the information in the VDF implementation to perform different functions for the enterprise. In one application, the VDF relationships in the illustrated hierarchy are used to determine that the product named "SuperPerseus" is actually a version of the BetaPerseus model that is based on version 2.4. In another application, the VDF names are used to help provide names for products as new products are developed by automatically including the product type and model name and by preventing the re-use of an existing version number. Embodiments of this application enforce a rule that each name shall be unique. The enterprise uses the VDF with other embodiments of such an application to enforce other naming rules, such as requiring the model name shall be part of the device name. In this case the ambiguous name "SuperPerseus" is not allowed, and is discarded in favor of the automatic name, "BetaPerseus 2.5", or some allowed variation of that, which is stored as the name of node 162. In another application, the VDF names are used to help describe stored information about the enterprise for producing electronic documents.

The vocabulary data framework (VDF) captures simultaneous multiple relationships among names, products, solutions, services, documentation and activities for an enterprise. In particular, the VDF allows other relationships to be established between nodes simultaneously with the product type relationship. Furthermore, the VDF allows any of these new relationships to involve more than the two nodes of the binary parent-child relationship already described. For example, it allows a trinary relationship among a father node, a mother node, and a child node. In general, the VDF allows N-ary relationships among nodes, where N is any integer equal to or greater than one and specifies the number of participants in the relationship.

In the more general realm of the VDF, the enterprise is considered a data domain that includes many atomic concepts that may be related. Atomic concepts include any data item involved in the enterprise that is not subdivided into separately referenced storage units. These atomic concepts include the business vocabulary for the enterprise data that is the subject of the present invention. Concepts include product type names, as in the above example, but also comprise names of projects and departments and references to paragraphs, chapters, documents, images, multimedia files, database records, database queries, network resources, citations, and network addresses, among other things. The concepts and relationships are captured in conceptual graphs which are organized primarily by a partial-order relationship, commonly known as a type hierarchy. The concepts are nodes in the graph and the relationships are connections between two or more nodes. Both concepts and relationships have enumerated characteristics in some embodiments.

The graph of FIG. 1 is an example of a conceptual graph ordered by its product type hierarchy of binary (parent-child) relationships. Whereas this is one example based on a product type hierarchy, the VDF allows for simultaneous and inter-related multiple type hierarchies, as is explained in more detail in the following sections.

2.1 Multiple Hierarchies

As seen above in FIG. 1, concepts are related in a graph depicting product types. All the concepts in this graph are associated with one category of information in the enterprise data. That category is device product types, and that hierarchy relates concepts for products that are related in development history, structure or function. However, enterprise data may include other categories or relationships. In general, multiple categories encompass the enterprise data. For example, some of the enterprise data for an enterprise that manufactures and sells network devices are related to equipment solutions for common networking problems encountered by customers of the enterprise. Products of the enterprise that are unrelated by the hierarchy of FIG. 1 nevertheless may be useful to solve the same kind of customer problem. Thus, such products relate to the same solution. To reflect these relationships, enterprise data also are placed in a category called networking solutions in one embodiment, and are organized in a solutions hierarchy that exists concurrently with the product type hierarchy.

FIG. 2A depicts an example hierarchy of concepts in a networking solutions category. In this example, three solutions expressed by the concepts "single server local net," "wide area net (2 sites)" and "private wide area net (3 to 8 sites)" are stored in the data structures representing nodes 212, 214, 216, respectively. All three nodes are children of the root node 202 having name "networking solutions" for this category of concepts. In the solutions type hierarchy of FIG. 2A, arrow 205 represents a networking solutions parent/child relationship. All the relationships represented by arrows in FIG. 2A are of this type. This relationship type differs from the product type parent/child relationship represented by arrow 105 of FIG. 1. Both relationship types are parent/child binary relationships, but they relate concepts in different categories.

As shown in the example of FIG. 2A, the product GamaPerseus, at node 232, is part of the equipment solution for single server local networks of node 212. Both AlphaPerseus, at node 234 and Jason at node 235 are part of the equipment solution for wide area networks connecting two sites, at node 214. BetaPerseus 2.0, at node 236, and Hercules, at node 237, are part of the equipment solution for private wide area networks connecting three to eight sites represented by node 216. Nodes 242 and 244 represent software products Pegasus 3.3 and a graphical user interface (GUI) upgrade that are installed on the BetaPerseus 2.0 device in addition to the default software that comes with that device.

The concepts at nodes 202, 212, 214, 216 may be placed in a category called networking solutions. The concepts 232, 234, 235, 236, 237 have already been placed in a category called enterprise device products; but they may also be placed in the category networking solutions. The concepts at nodes 242, 244 may be placed in a category called software products and also in the networking solutions category. FIG. 2A demonstrates that hierarchies of concepts in categories of enterprise data may be defined in addition to the hierarchy of concepts in the product type category, and demonstrates that categories may overlap.

Alternatively, non-overlapping categories are used in other embodiments. In such an embodiment, the relationship represented by arrow 205 is expressed as a relationship of a sub-component to a component of a networking solution, in which the sub-component may be a different category than the component. Rules can be expressed for the relationship. One possible rule is: software can be a sub-component of hardware, but not the other way around. Similarly, a product can be a sub-component of a networking solution category but not the other way around.

2.2 Non-Binary Relationships

FIG. 2B depicts a conceptual graph of an example non-binary relationship. This ternary relationship (also called a 3-ary relationship or three participant relationship) is useful for capturing the expertise of a person in the use of a product in a technology area. In this example, this relationship is used to state whether the expertise of a technician in the use of a product device within a technology area is of a quality that can assume values of "unknown," "poor,". "average," "good," or "excellent."

The characteristics of the relationship type describe the number of participants and their category or categories. In this example the relationship type includes characteristics that indicate there are three participants, one from the user category, one from the technology category and one from the product device category. In addition, the characteristics of this relationship include at least one relationship value for storing the quality of expertise (unknown, poor, average, good, excellent). More details on defining and storing concepts and relationships are given in a later section.

The conceptual graph of this relationship in FIG. 2B shows three nodes 282, 284, 286 representing the three concepts, e.g., product BetaPerseus 2.0, technology private wide area network, and technician Jane, respectively. The three nodes are connected by a three-way, non-directional link 290. The link 290 includes an attribute named "quality" that takes on a value such as "good," indicating that Jane's expertise is good for using BetaPerseus 2.0 in private, wide area networks.

2.3 Documentation Category

Another category of concepts that is extremely useful to an enterprise, for both internal and external users, is documentation concepts, which encapsulate elements of electronic or tangible documents. Concepts within a documentation category include headings, sections, paragraphs, drawings, images, information type, and document type, among others. Information type concepts express the type of content in terms of how it is used, e.g., by what it says; for example, information type concepts include but are not limited to "Introduction," "Features & Benefits," "Product Photo," "External Article Section" etc. Documentation concepts may be organized in a document type hierarchy that facilitates automatically generating accurate, complete, up-to-date visual or printed documentation pertaining to a particular product or service. Document type hierarchies include, for example, "Data Sheet," "Product Home Page," "Press Release," "Operator's Manual," and "External Article." For example, a device, like the hypothetical Beta Perseus 2.0, can be linked by a relationship to a document type hierarchy describing the device, such as a "Perseus 2.0 Operator's Manual." As another example, a device, like the Beta Perseus 2.0, can be linked by a relationship to a section concept in a document type hierarchy describing the networking solutions of which the device is a component, such as a "Small Business Networking Press Release." More examples of document categories of concepts are given in a later section.

2.4 Multiple Inter-Related Hierarchies

As seen in the above examples, a single concept, such as the device product BetaPerseus 2.0 may appear in several separate hierarchies. According to one embodiment, information defining the concept is stored only once in the VDF and relationships are defined to all other nodes to which the concept is adjacent in all the hierarchies.

Hierarchies may be implemented using a variety of programming techniques and data storage. One advantage of this approach is that changes to the concept can be made in only one location in the VDF and all hierarchies immediately become up-to-date and reflect the changes. Further, all information generated based upon the hierarchies, such as documentation or screen displays, automatically reflects the changes.

Another advantage is that applications that retrieve the data can navigate one of the hierarchies to a particular concept and then immediately find the other hierarchies in which that concept occupies a node. Thus, a customer who has purchased a particular device product for one networking solution can determine other solutions that use that same device. The customer follows the current solution to the product and then reviews the relationships with other networking solutions of interest to the customer that utilize the device. When a networking solution of interest is found using the device, the newly found solution can be navigated above and below the node representing the device concept in order to determine what software and other devices, if any, are components and sub-components of the new solution. Further, the customer can search by solution and identify multiple products that can satisfy the solution. The customer can then inspect each of the products, obtain its documentation, and determine which product is best suited to the customer's particular needs. In some embodiments, such information is synchronized with the customer's online profile so that it is available for later reference and can be personalized.

Figure 3:
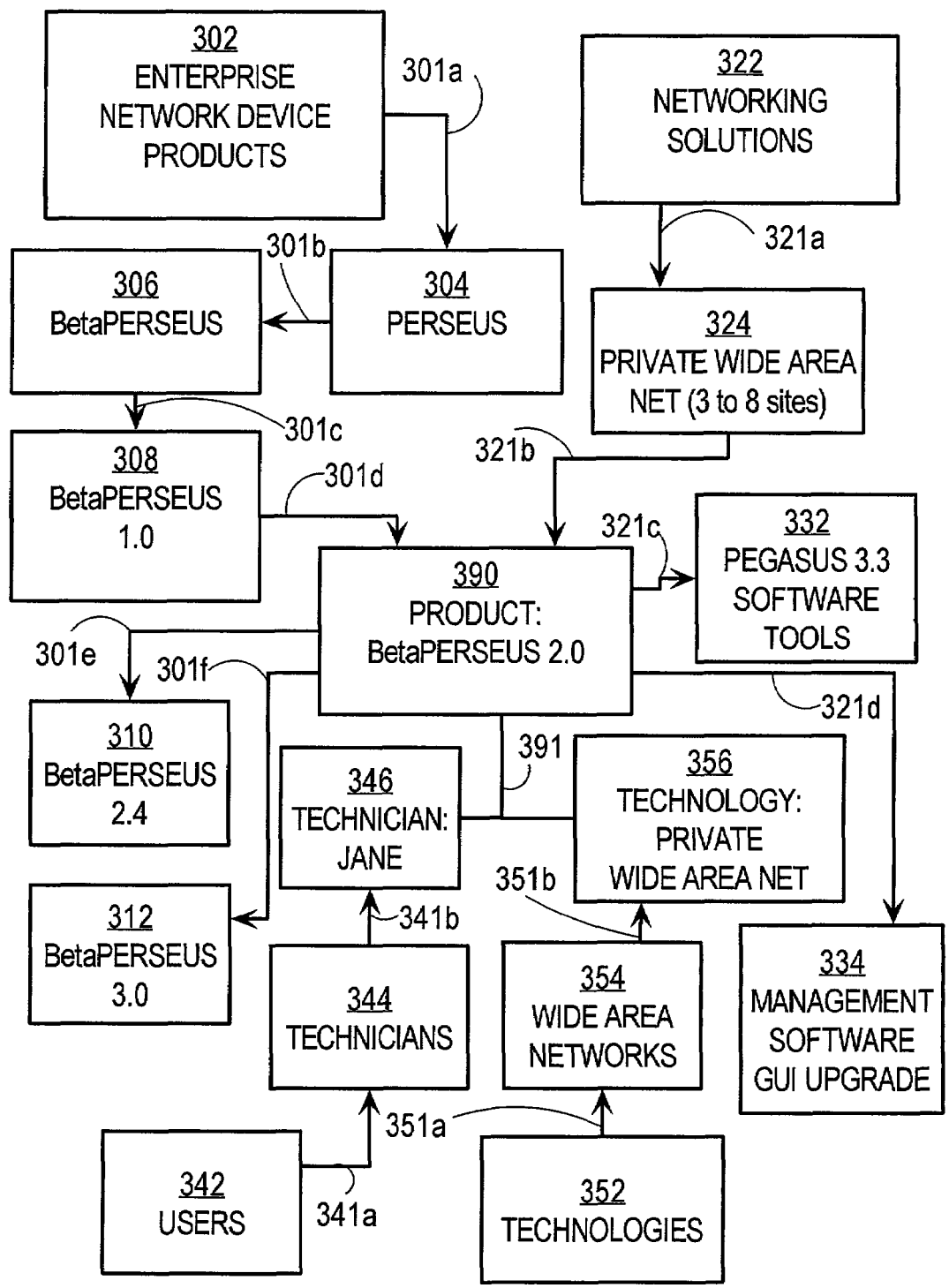
FIG. 3 is a block diagram illustrating simultaneous multiple inter-related hierarchies involving a product type concept according to one embodiment.

FIG. 3 is an example of a conceptual graph for multiple inter-related hierarchies that are associated with the device product BetaPerseus 2.0, based on the individual hierarchies and relationships of FIG. 1, FIG. 2A and FIG. 2B. The branch of the device product type hierarchy of FIG. 1 that includes the BetaPerseus 2.0 device concept appears as nodes 302, 304, 306, 308, 390, 310 and 312 linked by the device product type, binary parent/child relationships 301. The branch of the device networking solutions hierarchy of FIG. 2A that includes the BetaPerseus 2.0 device appears as nodes 322, 324, 390, 332 and 334 linked by the networking solutions type, binary parent/child relationships 321. The 3-participant expertise relationship 391 links the node 390 for the BetaPerseus 2.0 to the concept "Jane" at node 346 and the concept "private wide area networks" at node 356. Also shown is that the concept "Jane" at node 346 is a child of the concept "technicians" at node 344 which is a child of the concept "users" at node 342. These nodes are linked by user type, binary parent/child relationships represented by arrows 341. Also shown is that the concept "private wide area networks" at node 356 is a child of the concept "wide area networks" at node 354 which is a child of the concept "technologies" at node 352. These nodes are linked by technology type, binary parent/child relationships represented by arrows 351.

The BetaPerseus 2.0 concept at node 390 is linked to the following nodes in multiple inter-related hierarchies. The BetaPerseus 2.0 concept at node 390 is a product type child of the BetaPerseus 1.0 concept at node 308, as represented by arrow 301*d*. The BetaPerseus 2.0 concept at node 390 is a product type parent of the BetaPerseus 2.4 concept at node 310, as represented by arrow 301*e*, and the BetaPerseus 3.0 concept at node 312, as represented by arrow 301*f*. The BetaPerseus 2.0 concept at node 390 is further a solutions type sub-component of the private wide area net (3 to 8 sites) concept at node 324, as represented by arrow 321*b*. The BetaPerseus 2.0 concept at node 390 has solutions type sub-components of the Pegasus 3.3 software tools concept at node 332, as represented by arrow 321*c*, and the management software GUI upgrade concept at node 334, as represented by arrow 321*d*. The BetaPerseus 2.0 concept at node 390 has two companion expertise type participants as represented by link 391; one at Jane represented by node 346 and one at private wide area networks represented by node 356. In all, the example concept at node 390 has 6 binary relationships and one ternary relationship with eight nodes in four hierarchies (product type, equipment solutions, users and technologies). Each of the concepts and relationships may be represented using stored data in a database or appropriate programmatic data structures.

Many of the other nodes in FIG. 3 may have relationships with other hierarchies in addition to the relationships shown. These other relationships are omitted so that FIG. 3 and this discussion are more clear. Multiple relationships similar to the examples listed for node 390 may be defined for these other nodes.

2.5 Root Concepts

At the top of each hierarchy for each category is a category root node representing the category root concept from which all the other concepts in the category branch. For convenience in navigating from one category to the next, each of the category root nodes is made a child of an enterprise data root node representing a top-level pseudo-concept for the enterprise data. In one embodiment, the pseudo-concept is "Vocabulary," and every node related to the Vocabulary concept by a direct "child of" relationship is a root node representing a root concept for one category.

2.6 Implementation of the VDF

One embodiment uses a rule-base and declarative computation approach to express the concepts, relationships and rules of the VDF. This approach may be implemented using a high level computer programming language. In one embodiment, the approach is implemented using a logical processing language such as PROLOG™. The high level logical processing language translates statements declaring types and statements expressing rules about combining types into another language, such as the C programming language, that can be compiled and run on a large variety of general-purpose computer platforms.

In this embodiment, the concepts, relationships, attributes and logical implications (including integrity constraints and general computations) are expressed as logical assertions. There are two kinds of logical assertions, facts and rules. A fact is a logical assertion that is considered unconditionally true. A rule is a logical assertion whose truth or lack of truth depends on the truth or lack thereof of other assertions. In this implementation, concepts, relationships and attributes are generally represented as facts, whereas logical implications are represented using rules.

2.6.1 Defining Concepts

For example, in one embodiment, a statement declaring that the phrase BetaPerseus 2.0 is a concept is presented in a high level logical processing language by the expression:

('BetaPerseus 2.0', is Concept)

Similar expressions are used to enter the other concepts in the vocabulary.

The concept may have several attributes besides the phrase that defines it. For example the concept may have a creation date and an author. Attributes of a concept are presented with the following expression:

('BetaPerseus 2.0', 'creation', 'Sept. 19, 2000', 'author', 'John Smith')

2.6.2 Defining Relationships

The relationships that constitute a hierarchy connect one concept to one or more other concepts. Relationships are defined with the following expression:

(r('ConceptX', 'ConceptY', 'ConceptZ'), relationship (rID))

where r is a name for the relationship type, ConceptX, ConceptY and ConceptZ are the three concepts related by this statement, making the relationship r a ternary relationship, and this particular relationship has a unique relationship identification number rID. To ensure uniqueness, the value of rID is supplied when the relationship is defined by the system performing the logical processing. Using this expression, the "product type child of" relationship can be defined by the statement:

(product_child_of ('BetaPerseus 2.0', 'BetaPerseus 1.0'), relationship (rID2)).

According to this statement, the relationship rID2 links BetaPerseus 2.0 to BetaPerseus 1.0 by a relationship of relationship type "product_child_of."

The ternary relationship of FIG. 2B is defined, after each of the individual concepts are defined, by the expression:

(expertise('BetaPerseus 2.0', 'Jane', 'wide area networks'), relationship (rID3).

According to this statement, the relationship rID3 links the concept BetaPerseus 2.0 with the concept 'Jane' and the concept 'wide area networks' by a relationship of type "expertise."

Similarly, a marketing document stored as a Web page on a network and identified by its universal resources Locator (URL) address 'http:///www.Enterprise.com/literature/devices/catalog/Chap2/' is related to the concept 'BetaPerseus 2.0' by the expression:

(marketDoc('BetaPerseus 2.0', 'http:///www.Enterprise.com/literature/devices/catalog/Chap2/'), relationship (rID4))

The system returns a unique value for rID4, which is used to reference this particular relationship of type marketDoc in later statements.

The relationships defined above can also be given attributes according to this embodiment. Typical relationship attributes include the author of the relationship and the date the relationship is created. These attributes are set for a relationship having an unique identification of rID1 with the expressions:

(rID1, 'creator', 'John Dow')
(rID1, 'date', 'Oct. 10, 2000').

Relationships may have other attributes. For example, the expertise relationship defined above has an attribute for the quality of the expertise, which, in the instance of Jane on wide area networks for the BetaPerseus2.0, is good. This attribute is expressed in this embodiment as follows (rID3, 'quality', 'good')

where rID3 is the unique identification for the expertise relationship among Jane, BetaPerseus 2.0 and wide area networks returned by the system when the relationship was created, as described above.

A relationship can also be defined for other relationships. For example, a relationship of type "revision" is used to track changes in another relationship.

(revision (rID5, rID6), relationship (rID7))

The use of the revision relationship is illustrated in the following. If the marketing document for the BetaPerseus 2.0 is changed to a different URL, 'http://www.Enterprise.com/Hello/Chap2/', a new relationship is formed by the statement (marketDoc('BetaPerseus 2.0', 'http://www.Enterprise.com/Hello/Chap2/'), relationship (rID8))

To show that his new relationship with identification rID8 is just a revision of the old relationship with identification rID4 (see above), the revision relationship type is used as follows:

(revision (rID4, rID8), relationship (rID9))

Now, relationship rID9 associated with old relationship rID4 can be used to determine the new relationship rID8 that replaces the old relationship rID4.

2.6.3 Defining Rules

The hierarchies that relate concepts may have to follow certain rules. For example, as stated above, the product type hierarchy requires that a child have only one parent. These rules are enforced using logical constraints defined in a high level logical processing language as rules. A constraint that detects multiple parents in a set of expressions in the high level logical processing language of one embodiment is given by the expression:

(constraint(ConceptC, multiparent (ConceptP1, conceptP2))) if (ConceptC, childOf, ConceptP1), (ConceptC, childOf, ConceptP2), ConceptP1~=ConceptP2.

which reads, ConceptC has multiple parents ConceptP1 and ConceptP2 if ConceptC is a child of ConceptP1 and ConceptC is a child of ConceptP2 and ConceptP1 is not equal to ConceptP2. A statement is inserted which throws an error if the multiparent constraint is detected.

Another example of a rule that is enforced in the high level logical language as a constraint is the rule that every concept must be a descendent of a root concept. As described above, a root concept is a concept that is a child of the pseudo concept "Vocabulary." A concept is a descendent of the concept Vocabulary if the concept Vocabulary is reachable from the concept by a succession of one or more "child of" relationships. If the concept Vocabulary cannot be reached from a given concept, then the given concept is an orphan concept. Orphan concepts are a violation of the rules for the product type hierarchy and generally result from errors in concept definitions or are introduced when a parent concept is deleted from the hierarchy. This constraint depends on a definition of "reachable." Reachable is defined as follows:

(reachable(ConceptX,ConceptY)) if (ConceptX, childOf, ConceptY)

(reachable(ConceptX,ConceptY)) if (reachable(ConceptX,ConceptW)), (reachable (ConceptW,ConceptY))

which reads, ConceptX reaches ConceptY either if ConceptX is a child of ConceptY or if there is a ConceptW such that ConceptX reaches ConceptW and ConceptW reaches ConceptY. The constraint is then expressed as follows:

(constraint (ConceptC, orphanconcept)) if~(reachable (ConceptC, 'Vocabulary')) which reads, CocneptC is an orphan concept if ConceptC does not reach the pseudo concept "Vocabulary." A statement is inserted which throws an error if the orphanConcept constraint is detected.

As discussed above, the example expressions presented in this section are processed by the high level logical processing system to generate code, such as C language code, that implements the concepts, relationships and constraints defined in these expressions. The C language code can then be compiled and executed on any computer system with a C compiler. Further, the C language code can be incorporated in other application programs or compiled into libraries having functions that are called from separate application programs.

3.0 Vocabulary Database

A vocabulary database provides persistent storage for the concepts, relationships, and rules of the vocabulary data framework for the enterprise data.

One embodiment uses a relational database to store the concepts and the relationships among concepts and the rules; however, any suitable data store can be used. In one specific embodiment, a cached data store is used. A relational database uses a schema to describe a series of tables each made up of one or more rows, each made up of one or more fields. The schema names the table and the fields of each row of the table. An example relational database schema to implement the VDF according to one embodiment is described below. In some embodiments the relational database includes a unique row identification number (rowID) for each row in each table.

In this embodiment, a vocabulary table includes a row for each root concept in the VDF. The fields of each row include the concept name, the concept description and the creation date, as shown in Table 1. A unique rowID may also be included in each row but is not shown in the example tables. Example root concepts are included in several rows of Table 1.

TABLE 1

The Vocabulary Table

| Root Category Name | Description | Creation Date |
|---|---|---|
| Product | Product category | Apr. 12, 2000 |
| User | User category | Apr. 12, 2000 |
| Technology | Technology Category | May 15, 2000 |
| Solution | Networking Solutions Category | Jan. 1, 2001 |

Each root concept in the vocabulary table has its own table comprising one row for every concept within the category. All concepts that are descendants of the root concept via the "child of" relationship are stored in the table defined by the root concept. Table 2 is an example Table for the Product root concept.

TABLE 2

The Product Category Table

| Name | Description | Creation Date |
|---|---|---|
| Network Device Products | Enterprise devices | Apr. 12, 2000 |
| Perseus | router product | Apr. 12, 2000 |

TABLE 2-continued

The Product Category Table

| Name | Description | Creation Date |
|---|---|---|
| Hercules | gateway product | Apr. 12, 2000 |
| Jason | hub product | Apr. 12, 2000 |
| AlphaPerseus | router product | Apr. 12, 2000 |
| BetaPerseus | router product | Jun. 16, 2000 |
| BetaPerseus 1.0 | router product | Jun. 16, 2000 |
| GammaPerseus | router product | Sep. 19, 2000 |
| BetaPerseus 2.0 | router product | Sep. 19, 2000 |
| BetaPerseus 2.4 | router product | Dec. 12, 2000 |
| BetaPerseus 3.0 | router product | Jan. 1, 2001 |
| SuperPerseus | router product | Feb. 1, 2001 |

Several tables are employed to store relationships. These tables support N-ary relationships. The relationship type table holds one row for each relationship type, as illustrated in Table 3 for some sample relationship types described above. The table rows include fields for the name of the relationship type, as used in the high level language or conceptual graphs, a fuller description of the relationship, the number of participants and the creation date.

TABLE 3

The Relationship Types Table

| Relationship Type Name | Description | Number of Participants | Creation Date |
|---|---|---|---|
| product_child_of | product lineage | 2 | Apr. 12, 2000 |
| solution_child_of | solution lineage | 2 | Apr. 12, 2000 |
| user_child_of | user categories | 2 | Apr. 12, 2000 |
| technology_child_of | technology lineage | 2 | Apr. 12, 2000 |
| expertise | expertise of person with product in technology | 3 | Jan. 1, 2001 |
| marketDoc | Marketing document for product | 2 | Sep. 19, 2000 |
| revision | track revisions in concepts/relationships | 2 | Feb. 1, 2001 |

The participant type table holds one row for each participant type in a relationship type, as illustrated in Table 4 for the example relationships of Table 3. This table has a row for each participant of each relationships type. Each row has fields for the name of the relationship type, the role of the participant in the relationship, and the participant type, which is the category of the concept that may fill the given role in the relationship type.

TABLE 4

The Participant Types Table

| Relationship Name | Role | Participant Type |
|---|---|---|
| product_child_of | child | Product |
| product_child_of | parent | Product |
| solution_child_of | child | Networking Solution/Product |
| solution_child_of | parent | Networking Solution/Product |
| user_child_of | child | User |
| user_child_of | parent | User |
| technology_child_of | child | Technology |
| technology_child_of | parent | Technology |
| expertise | person | User |
| expertise | product | Product |
| expertise | technology | Technology |

TABLE 4-continued

The Participant Types Table

| Relationship Name | Role | Participant Type |
|---|---|---|
| marketDoc | product | Product |
| marketDoc | document | Document |
| revision | old version | Vocabulary/relationshipID |
| revision | new version | Vocabulary/relationshipID |

The relationship instance table (Rinstance table) and the participant instance table (Pinstance table) have entries for every instance of the relationships as they are defined for the enterprise data. An example Rinstance table is shown in Table 5 and an example Pinstance table is shown in Table 6, for some of the relationships described above. When a particular relationship is defined between two or more concepts, a new relationship identification (rID) is generated. In one embodiment the particular relationship ID, rID, is the unique rowID corresponding to the next row in the Rinstance table.

TABLE 5

The Relationship Instance (Rinstance) Table

| rID | Relationship Type Name | Creation Date |
|---|---|---|
| 5000 | product_child_of | Sep. 19, 2000 |
| 5001 | marketDoc | Sep. 19, 2000 |
| 5002 | product_child_of | Sep. 19, 2000 |
| 5003 | expertise | Sep. 19, 2000 |
| 5004 | marketDoc | Sep. 20, 2000 |
| 5005 | revision | Sep. 20, 2000 |

When a "product child of" relationship is created between the HetaPerseus 2.0 and BetaPerseus 1.0 on Sep. 19, 2000, an entry is made into a row of Table 5 and a unique rID of "5000" is generated by the system. Then two rows are added to Table 6 for the two concepts that participate in the "product child of" relationship that has just been added to Table 5. Those two rows each list in the rID field the rID value of "5000" generated for this relationship. One row is generated in Table 6 for the concept BetaPerseus 2.0 in the participant role of child for rID "5000." A second row is generated in Table 6 for the concept BetaPerseus 1.0 in the participant role of parent for rID "5000."

TABLE 6

The Participant Instance (Pinstance) Table

| rID | role | Participant |
|---|---|---|
| 5000 | child | BetaPerseus 2.0 |
| 5000 | parent | BetaPerseus 1.0 |
| 5001 | product | BetaPerseus 2.0 |
| 5001 | document | http:///www.Enterprise.com/literature/devices/catalog/Chap2/' |
| 5002 | child | BetaPerseus 2.4 |
| 5002 | parent | BetaPerseus 2.0 |
| 5003 | person | Jane |
| 5003 | product | BetaPerseus 2.0 |
| 5003 | technology | private wide area net |
| 5004 | product | BetaPerseus 2.0 |
| 5004 | document | http:///www.Enterprise.com/Hello/Chap2/ |
| 5005 | old version | 5001 |
| 5005 | new version | 5004 |

On the same date, in this example, the new product is related to its marketing document with the marketdoc relationship that gets rID "5001." Its participants are listed in Table 6 on the two rows having rID "5001." Later that day a new product_child_of relationship is generated for BetaPerseus 2.4 and receives rID "5002." Its participants are listed in the two rows of Table 6 with rID of "5002." Then the expertise relationship of Jane using the BetaPerseus 2.0 in private wide area networking is established on the same day and gets an rID of "5003." The three participants of that relationship are added to Table 6 in the three rows with an rID value of "5003." The next day, on Sep. 20, 2000, a new marketing document is associated with the product by generating a new marketdoc relationship that receives the rID of "5004." The product and document participants are added to Table 6 in the rows showing an rID value of "5004." Finally, the revision of the marketing document is memorialized with the revision relationship, which receives an rID of "5005." The two participants of the revision relationship are added as two rows to Table 6 having an rID value of "5005" in Table 5. The two participants are the old marketDoc relationship rID of "5001" and the new marketDoc relationship rID of "5004." Though participants are listed in Table 6 with increasing values in the rID field, it is not necessary that the value of rID increase monotonically for the system to operate.

The "is a" relationship is a common relationship that also could be represented with entries in the Relationship Type, Participant Type, Relationship Instance and Participant Instance tables. However, better performance is achieved if all instances of an "is a" relationships are placed in an "Is_A" table. For one embodiment, an example Is_A table is shown in Table 7. For this example, all "product child of" relationships are kept in this Is_A table.

TABLE 7

Is A Table.

| Concept Name | Parent Concept | Creation Date |
|---|---|---|
| Enterprise Network Device Product | Product | Apr. 12, 2000 |
| Perseus | Enterprise Network Device Product | Apr. 12, 2000 |
| AlphaPerseus | Perseus | Apr. 12, 2000 |

Attributes of concepts and relationships beyond those already included in the above tables are kept in one or more attributes tables. In one embodiment, all these additional attributes of concepts are kept in a single concepts attributes table. Similarly, all the additional attributes of relationships are kept in a single relationships attributes table. Table 8 is an example concepts attributes table for the example concepts described above.

TABLE 8

Concepts Attributes Table.

| Concept Name | Attribute Name | Attribute Value |
|---|---|---|
| BetaPerseus 2.0 | author | John Smith |

Table 9 is an example relationships attributes table for the example relationships described above. The expertise relationship was described above to include an attribute called "quality" for indicating the quality of the expertise using one of the values "unknown," "poor," "average," "good," and "excellent." This relationship type occurred in the relationship having rID of 5003 as shown above in Table 5. Therefore the corresponding entry in the relationships attributes table is given in Table 9.

TABLE 9

Relationships Attributes Table.

| rID | Attribute Name | Attribute Value |
|---|---|---|
| 5003 | quality | good |

The rules that express general computations and constraints on the relationships are also stored in tables. In this embodiment, the rules are stored as text for the high level logical processing language. In this way, the stored rules can be imported directly into a rules engine program of the high level logical processing system. Table 10 is an example rules table including the reachable rule described above.

TABLE 10

Rules Table

| Rule Name | Rule Statement Sequence Number | Rule Statement |
|---|---|---|
| reachable | 1 | reachable (ConceptX, ConceptY) if (ConceptX, child of, Concept Y) |
| reachable | 2 | reachable (ConceptX, ConceptY) if reachable (ConceptX, ConceptW), reachable (ConceptW, ConceptY) |

One embodiment of the VDF allows multiple concepts from different concept categories to have the same name. The duplicate names are converted to unique identifiers called DupIDs and the unique identifiers are used in the concept database. The duplicates table is used in the conversion process. Table 11 is an example duplicates table for an embodiment in which a product concept and a technology concept both use the name Perseus. In this case, the name inserted into the second row of Table 2 above would be "1234" instead of "Perseus."

TABLE 11

Duplicates Table

| DupID | Name | Category |
|---|---|---|
| 1234 | Perseus | Product |
| 2789 | Perseus | Technology |

One embodiment of the VDF also allows raw terms to be stored in the database. Raw terms are words or phrases that may become a concept at a later time. Raw terms can originate from a wide variety of sources, such as a trade journal article reviewing a product or a customer order. The raw terms are stored in this embodiment in a dedicated table. Table 12 is an example raw term table.

TABLE 12

The Raw Terms Table

| Raw Term Name | Description | Creation Date | Category |
|---|---|---|---|
| SuperPerseus | term for BetaPerseus 2.5 coined by Reviewer A. Newman | Dec. 12, 2000 | Product |
| P-Routers | Term for Perseus routers in customer request from Company A | Sep. 25, 2000 | Product |

4.0 Vocabulary Development Server

The Vocabulary Development Server (VDS) is one or more processes that provide management of and access to the enterprise data in the vocabulary database to other processes in an enterprise data processing system. Herein, the vocabulary database is also called the VDS Concept Database.

In the disclosed embodiment, the VDS includes several object-oriented application program interfaces (APIs). Several of the VDS APIs use function calls that are configured to allow client processes to interact with the database application without a need to know the organization of the database implementation. This allows modifications to be made to the database organization, such as adding relationships or adding or deleting levels to one or more hierarchies, without changing the client processes. All adjustments to changes in the database are accommodated in the VDS APIs.

Figure 4A:
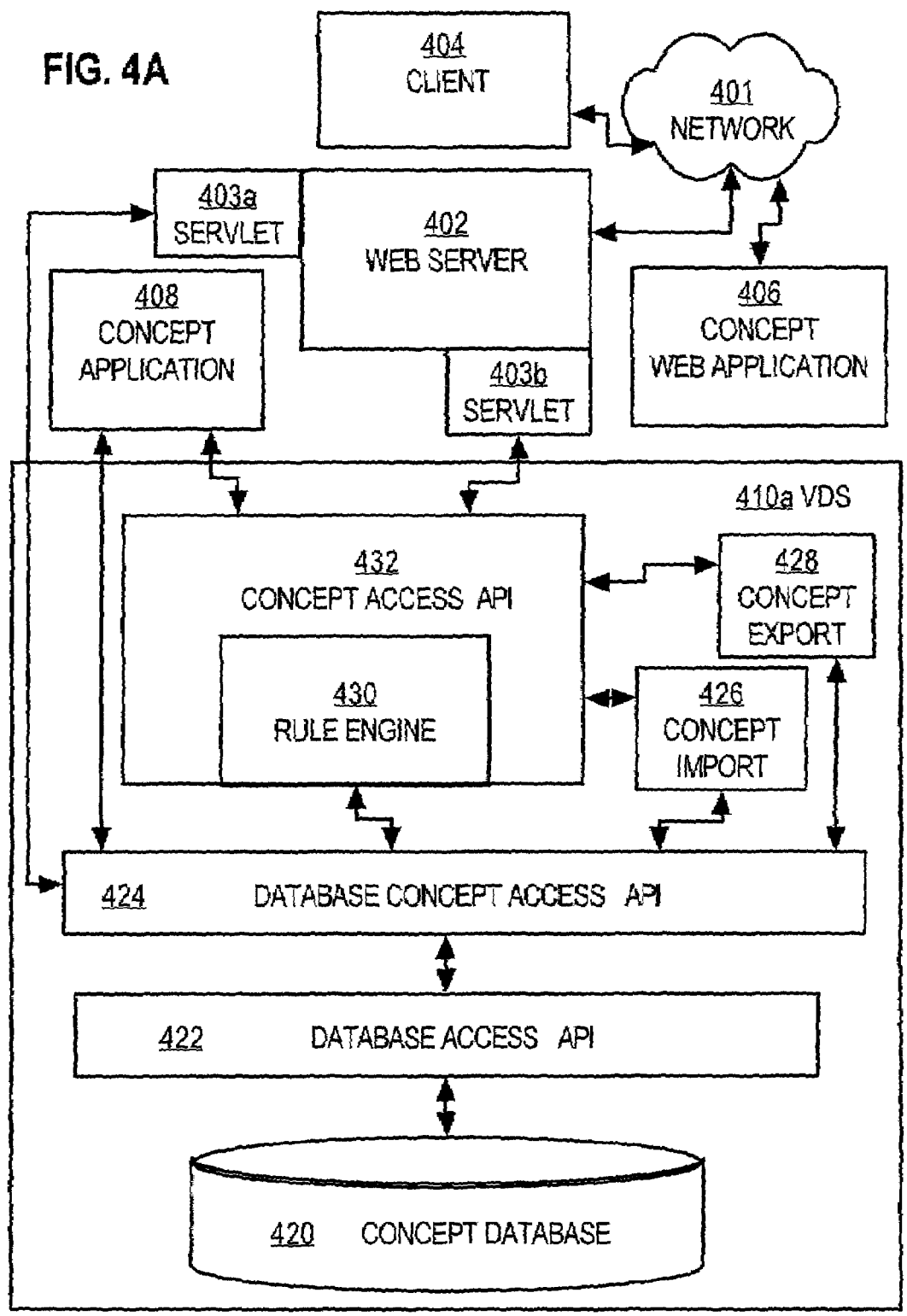
FIG. 4A is a block diagram illustrating a vocabulary development server and external applications according to one embodiment.

FIG. 4A is a block diagram showing the architecture of the VDS 410 and its relationship to some external processes. The VDS Concept database 420 is described above. A database access API 422 provides processes to operate on the database rows and tables based on knowledge of the database schema. These processes include connecting to the database, starting a transaction, such as adding, deleting or modifying a row in a table, committing the change in the row to the persistent storage, aborting a transaction, and disconnecting from the database. The database access API 422 also provides processes for adding, deleting, and modifying a raw term in the raw term table.

A database concept access API 424 provides processes for manipulating concepts, relationships and rules in the concept database without requiring knowledge of the actual database schema. For example, processes are included to return all the concepts in a given category, to generate and store a concept category, to add a concept to a category, to return sub-concepts (that is, concepts that are descendent of a given concept), to return child concepts, to return the parent concept of a given concept, to return ancestor concepts, to rename a given concept, to set the parent of a given concept, to delete a concept, and to return duplicate mapping. The database concept access API 424 also includes processes for manipulating relationships, such as to return all relationships, to return all relationship types, to return all "Is_A" relationships, to return all relationships of a given type, to generate and store a relationship type, to generate and store a relationship, to modify a participant or participant type in a relationship type, to modify a participant instance in a relationship instance and to delete a relationship. The database concept access API 424 includes processes for manipulating attributes, such as to return attribute information for all concepts in a given category, to set attribute information, to update attribute information, and to delete attribute information. The database concept access API 424 includes processes for manipulating rules, such as to return all rules in the rule table, to return all rules with a given name, to set the definition of a rule with a given name and sequence number, to generate and store a new rule with a given name and definition, to delete a given rule, and to delete rules with a given name.

The VDS database concept access API 424 is used by applications that are external to the VDS 410, such as concept application 408, and servlet 403a of Web Server 402. The VDS database concept access API 424 is also used by other processes within VDS 410, such as the concept import module 426 and the concept export module 428, and the rule engine 430 of the concept access API 432. All elements of FIG. 4A that are shown outside of VDS 410 are shown by way of example, and are not required. Further, the structural elements of VDS 410 are shown as examples and the specific architecture shown is not required.

The concept import module 426 is designed for the bulk import of a large amount of data, splitting that data into concepts, and storing the concepts in the concept database 420. The concept export module 428 is designed for the bulk export of a large number of related concepts and concept attributes to an external system, such as concept application 408, and client 404 or concept web application 406 through the Web server 402 via servlet 403b.

The concept access API 432 provides processes for use by other applications that deal with groups of related concepts, or for responding to queries about concepts, relationships and rules that are received from external application programs. The API is used, for example, by the concept application 408 and servlet 403b of Web server 402 which are technically client processes of the VDS. Through network 401 and the Web server 402, a standalone client 404 such as a Web browser or a concept Web application 406 obtains and uses concept data. These are technically client processes of the Web server 402.

The concept access API 432 groups related concepts based on the requests made by the client processes. The concept definitions and relationships are checked to determine that constraints are not violated. Rules that are employed to define the computations or constraints employed by the concepts and relationships are obtained from the concept database 420 through the database concept access API 424, are converted to executable statements, and are executed by the rule engine 430 of the concept access API 432.

In one embodiment, the rule engine 430 is integrated with the concept access API 432 through the use of a foreign function facility of the PROLOG™ rule engine. This component provides service functions that enable the rule engine to access information, including rules expressed in text of a high level language, from the concept database 420 through the database concept access API 424. Rule execution functions can execute in the rule engine 430 the rules retrieved from the database 420. These functions marshal the function arguments (such as concepts/relationships/attribute) into the rule arguments, execute the PROLOG™ rule and retrieve any results, and un-marshal the rule results into a results set suitable for returning back to the client process, e.g., the calling application.

In this arrangement the concept database can be continually updated with new concepts, new hierarchies, new levels in old hierarchies, new relationships between hierarchies, and new rules, without requiring changes in the applications such as concept application 408, Web server 402, standalone client 404, or concept Web application 406. Any changes dictated by changes in the database 420 can be accommodated by changes in one or more of the APIs of the VDS, such as database access API 422, database concept access API, and concept access API 432.

5.0 Information Object Repository (IOR)

According to one embodiment, the concept application 408 is an information object repository application. An information object repository (IOR) holds content for documents. For example, in this embodiment, the marketing document described above at URL address 'http:///www.Enterprise.com/Hello/Chap2/' is in the IOR. The content is stored and retrieved in units of data herein called information object. An IOR application produces documents, such as operating manuals, marketing documents, and Web pages for a Web site by combining one or more information object in the IOR. One or more IOR processes employed by the IOR application manage the IOR by relating the content in the IOR to one or more concepts in the concept database 420 and determine the information object to incorporate into documents based on one or more relationships in the concept database 420.

Using this technique, content originally unrelated and authored over time by many different persons and organizations can be related using the business vocabulary concepts and relationships in the VDS. Thus a person wishing to learn about the BetaPerseus 2.0 can use an IOR application to find all the manuals, press releases, and articles that describe it no matter when or by whom the document was written, as long as the content is registered with the IOR.

As another example, a system put together by a joint venture can produce a system document that uses descriptions of the components originally written independently by the joint venture partners. In addition, the information object supplied to a requester can be tailored to the person making the request, for example, by providing more technical information to a technical user than to a marketing user. Furthermore, information objects can easily be reused in several documents. For example, an introductory paragraph for the BetaPerseus 2.0 written for a marketing document can be used in a press release, a data sheet, and the home page for the BetaPersus 2.0 on the Web site of the enterprise.

Embodiments are described herein in the context of examples involving generation of electronic documents in the form of Web pages. Embodiments are applicable to generation of any form of electronic document, and are not limited to use with Web sites or Web pages.

5.1 IOR Creation Layer

Figure 4B:
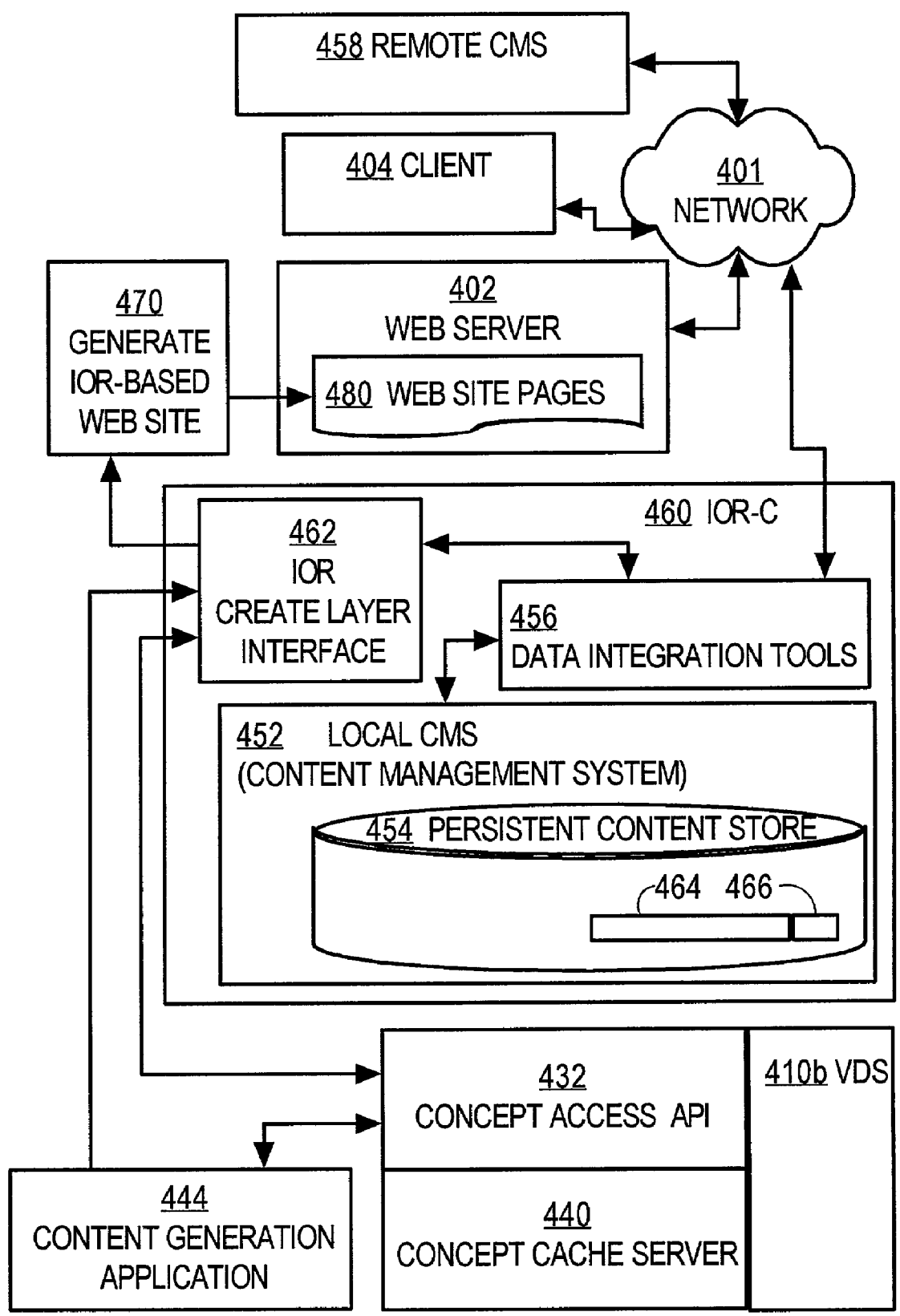
FIG. 4B is a block diagram illustrating a creation layer of an information object repository and a resulting Web site according to one embodiment.

One set of IOR processes are used to manage the registration of information objects into the IOR and the concept database. This set of IOR processes and the data storage for the IOR comprise the creation layer of the IOR, herein designated IOR-C. FIG. 4B is a block diagram illustrating the IOR-C of the IOR according to one embodiment.

In this embodiment, the IOR processes are invoked through an interface 462 for the IOR-C 460. For example, an application programming interface of the IOR-C interface 462 is invoked by a content generation application 444. In another example, an IOR administrator performs administration of the IOR through an administrator user interface of the IOR-C interface 462. In other embodiments the IOR processes execute under control of a standalone IOR batch or user-interactive application.

The IOR-C interface 462 includes methods to access the business vocabulary development server (VDS) 410 of the enterprise through the concept access API 432. As shown in FIG. 4B, this embodiment of the VDS 410b has an external concept access API 432 which uses a concept cache server 440 to speed retrievals from the VDS 410b. The concept cache server 440 uses a cache memory to temporarily store a subset of the concepts and relationships in the concept database (420 in FIG. 4A) of the VDS 410b.

The IOR-C interface 462 includes methods to store and retrieve information objects in a content management system (CMS) such as in a local CMS 452 or over the network 401 in a remote CMS 458. A CMS includes persistent storage where an information object is stored. For example, persistent content store 454 includes information object 464.

A CMS is capable of managing a variety of types of information in each information object. For example an information object may comprise a block of text, an application program, a query for a database, a vector graphic, an image, audio data, video data, and other binary data. The block of text may be text that represents code for a compiler, such as C code, and formatted text, such as text in the Hypertext markup language (HTML) or in the extensible markup language (XML), as well as unformatted text using one of several character codes, such as ANSI one byte and Unicode four byte codes.

In some embodiments, the CMS comprises the local operating system directory structure. For example, different information objects are simply kept in different files with different file extensions for the different types of data, and the files are organized into one or more directories in a hierarchy of directories and files. In another embodiment, the CMS is a database server for managing a database of information objects.

It is not necessary that all the information objects be in a single CMS on one computer device. Data integration tools 456 are commercially available for associating data in one CMS, such as CMS 452, with data in another CMS, such as remote CMS 458. In the depicted embodiment, the methods of the IOR-C interface access the data integration tools 456. In an embodiment with all the information objects stored in a single local CMS, the data integration tools 456 are not included, and the methods of the IOR-C interface access the local CMS 452 directly.

Each information object in the CMS is identified uniquely by an information object reference 466. Depending on the CMS employed, the reference may be a file name, a file name including one or more directories in the hierarchy of directories, a network resource address, a universal resource locator (URL) address, a record identification in a predetermined database, or a record identification in a predetermined content management system.

FIG. 4B also shows a process 470 for generating pages 480 for a Web site on Web server 402 using the IOR-C interface to access the VDS 410 and the persistent content store 454. The process 470 is described in more detail in a later section.

The IOR-C interface 462 includes methods to manage the IOR by relating the information objects in the CMS to one or more concepts in the concept database 420. The IOR-C interface includes methods to generate and retrieve information object concepts in the concept database associated with the information objects. The IOR-C interface also includes methods to generate and retrieve relationships between the information object concepts and other concepts in the concept database.

5.2 Information Objects and Relationships

For each information object that is registered in the IOR 460 by a method of the IOR-C interface 462, a particular information object concept is added to the concept database of the VDS 410b. In one embodiment, an information object category is added to the Vocabulary Table (such as the sample Vocabulary Table listed in Table 1). The particular information object is a child of the information object category and is represented as a new row in an Information Object Table. The concept cache server 440 or concept access API 432 is invoked by the IOR-C method to add this concept to the database. In another embodiment, an information object relationship is added to the Relationship Instance Table (such as the sample Relationship Instance Table listed in Table 5). In this embodiment, the information object is an instance of an information type relationship type which is listed in the Relationship Type Table (such as the sample Relationship Type Table listed in Table 3).

Table 13 lists sample entries in a hypothetical Information Object Table according to the embodiment in which the information object is a concept. In this embodiment, the information object concept has a name that is the unique reference for the corresponding information object in the CMS. As shown in Table 13, the unique reference is a URL in this embodiment.

TABLE 13

The Information Object Table

| Name | Description | Creation Date |
| --- | --- | --- |
| http://www.Enterprise.com/literature/devices/catalog/Chap2/ | marketing document for Perseus routers | Sep. 19, 2000 |
| http://www.Enterprise.com/Hello/Chap2/ | marketing document for Perseus routers | Sep. 20, 2000 |
| ftp://Enterprise.com/literature/devices/Perseus/Intro17.txt/ | BetaPerseus introductory paragraph for silver partner marketing person | Dec. 12, 2000 |
| ftp://Enterprise.com/literature/devices/Perseus/Intro5.txt/ | BetaPerseus 2.0 introductory paragraph for technical person | Apr. 12, 2000 |
| http://Enterprise.com/datasheets/DS33/ | BetaPerseus 2.0 data sheet table | Apr. 12, 2000 |
| http://Enterprise.com/datasheets/DS12/ | Jason data sheet table | Apr. 12, 2000 |

Adding the information object concept to the concept database links the concept database to an information object in the CMS, but this action alone does not relate one information object to another. Once a particular information object concept has been added to the concept database, a relationship is formed with one or more other concepts in corresponding other hierarchies. As each information object has an information object concept added to the database and linked to another concept, relationships between the information objects are implied by the relationships between the corresponding concepts.

For example, an instance of a "has info object" relationship type is added to the database to relate at least one product concept to each information object added. These relationships relate the first and second information objects in Table 13 to the Perseus concept in the product hierarchy, the third information object to BetaPerseus concept, the fourth and fifth information objects to the BetaPerseus 2.0 concept, and the sixth information object to the Jason concept in the product hierarchy. Since both the fourth and fifth information objects are related to the same product concept, by implication the information objects are related to each other. In this way, the information objects referenced by URLs "ftp://Enterprise.com/literature/devices/Perseus/Intro5.txt/" and "http://Enterprise.com/datasheets/DS33/" are related by implication, and can reasonably be placed in the same document in some circumstances. In this example, the two information objects referenced by the fourth and fifth information objects are closely related even though those two information objects reside in the CMS in entirely different levels of different subdirectories in the Enterprise.com directory.

Similarly, since BetaPerseus 2.0 is a child of BetaPerseus and BetaPerseus is a child of Perseus in the product hierarchy, the corresponding information objects are implied to share this same hierarchical relationship. Thus one can navigate among the information objects, and their associated information objects, using the relationships among the concepts related to the information objects. These techniques allow the rich collection of relationships in the concept database to provide organization for the information objects stored in the CMS.

Figure 5:
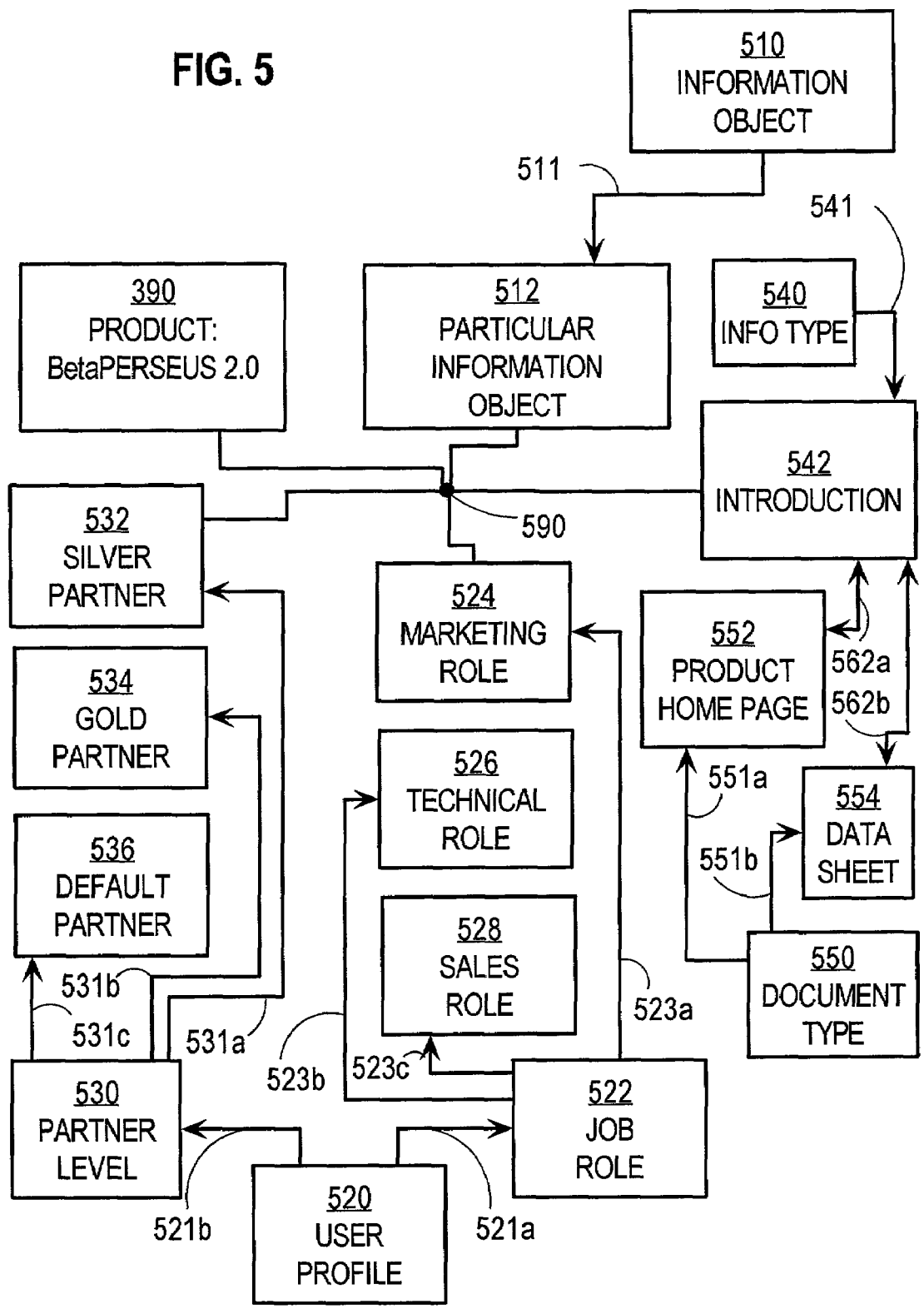
FIG. 5 is a block diagram that illustrates relationships involving a particular information object and other concepts in the vocabulary database.

FIG. 5 is a block diagram that illustrates relationships involving a particular information object and other concepts in the vocabulary database according to another embodiment. According to this embodiment, meaningful documents are produced from information objects by relating information object concepts not only to a concept in the product hierarchy but also to concepts in an information type hierarchy and concepts in a user profile hierarchy.

A particular information object concept 512 is a child of information object category 510 by the information object child of relationship indicated by arrow 511. The particular information object 512 is a participant in a 5-ary "has info object" relationship indicated by the five-pronged connection 590. This "has info object" relationship involves a concept 390 of the product hierarchy as in the above example, but also involves other concepts. The "has info object" relationship also involves a concept 542 in an information type hierarchy and two concepts in a "user profile" hierarchy, one a child concept 524 of a job role concept 522, and the other a child concept 532 of a partner level concept 530. These other concepts and hierarchies are described in more detail next. The 5 participant "has info object" relationship specifies that a particular information object provides a particular information type about a particular product in the product hierarchy of interest to a person playing a particular job role for a particular level of partner to the enterprise.

Introduction concept 542 is a child of an "info type" category 540 by the "info type child of" relationship indicated by arrow 541. According to this embodiment, various documents generated from the information objects use or reuse one or more concepts of the "info type" category. In one embodiment, the "info type" hierarchy is a one level hierarchy below the "info type" category as the root concept. Every different info type concept is a child of the "info type" root concept. The "info type" concepts include "Introduction," "Features and Benefits," "Product Photo," "Schematic Drawing," "Operational Properties," "Data Sheet Table," and "External Article Section," among others.

In another embodiment, the info type hierarchy is a multiple level hierarchy, with some info type concepts comprising one or more other info type concepts. For example, a "Data Sheet Table" info type concept has several child info type concepts, each one describing a different aspect of the product, such as the product's power consumption, its physical dimensions, and its weight, among others.

Another embodiment includes a child node of the information type root to distinguish application database content, Web services, and content information types.

In one embodiment, the generation of content for info types is controlled by one or more authoring templates. A template is a data structure storing some data and configured to store additional information provided by a user. A template often contains data employed by a process to prompt a user for the additional information. For example, an authoring template for the Data Sheet Table info type includes data indicating the several child info types that are included when a particular Data Sheet Table concept is generated. This example template is employed by a process to prompt a user to specify the information objects for all the child info types that make up the particular Data Sheet Table.

Each concept of the "info type" hierarchy is related to one or more concepts in a "document type" hierarchy by a "has_docinfo" relationship indicated in FIG. 5 by the double arrow 562. The "document type" hierarchy is a one level hierarchy below the "document type" category as the root concept. Every different document type concept is a child of the "document type" root concept. The "document type" concepts include "Marketing Document," "Product Home Page," "Data Sheet," "Press Release," "Operator's Manual," "Product Overview" and "External Article," among others.

In one embodiment, the "has_docinfo" relationship, such as 562, provides a specific organization of information objects to produce a particular document of a given document type. For example, a product marketing document type is a participant in four "has_docinfo" relationships, one each with a "Product Photo" information type concept having a position attribute value "first," an "Introduction" information type concept having a position attribute value "second", a "Features and Benefits" information type having a position attribute value "third" and an "Ordering" information type having a position attribute value "fourth." For another example, a product home Web page document type is a participant in five "has_docinfo" binary relationships, one each with a "Product Name Heading" information type in a first position, a "Introduction" information type in a second position, a "List of Other Info Types for Concept" information type in a third position, a "List of Other Documents for Concept" information type in a fourth position, and a "List of Next Concepts in Hierarchy" information type in the fifth position. The last three information type concepts do not need information objects to provide the content for the Web page document type, because these lists can be derived from the relationships in the VDS for a given concept. By tying information object concepts indirectly to document type concepts through information type concepts, a particular information object can be reused in more than one document under many versions and variations in other characteristics.

In another embodiment, a document type participates in binary relationships that identify an information type, template type, output type, and language.

In yet another embodiment, the presentation of info types in a document is controlled by one or more document presentation templates. For example, a document presentation template associated with a Product Overview document type determines info types to be included and their arrangement in the document. In one embodiment, several templates are employed for a single document type, one template for presentation on a printed page, another template for a Web page, and yet another template for display on a wireless device. Wireless devices typically have very small print areas and hold substantially less information than a Web page or printed page.

In some embodiments, the presentation of each info type is separately determined by one or more info type presentation templates.

The relationship 590 depicted in FIG. 5 of the "has info object" relationship type includes a marketing role concept 524 as a participant. Marketing role concept 524 is a child of a "job role" concept 522 which is a child of a "user profile" category 520 by the "user profile child of" relationship indicated by arrows 523a and 521a, respectively. According to this embodiment, the content in an information object referenced by an information object for a particular information type for a particular product depends on the job role of the person who is reading the document. The content is expected to be different for a person in a marketing role, concept 524, than one in a technical role, concept 526, or even one in a sales role, concept 528, which may represent some mixture of the content provided for the two other roles. These other job roles are also children of the job role concept 522. Still other job role children concepts are defined in other embodiments. For example, a "default" concept child of the "job role" concept 522 is used for a person who does not play a particular role. This person is treated as an uninitiated member of the general public.

Silver partner concept 532 is a child of a "partner level" concept 530 which is a child of a "user profile" category 520 by the "user profile child of" relationship indicated by arrows 531a and 521b, respectively. According to this embodiment, the content in an information object for a particular information type for a particular product depends on the kind of partner to the enterprise is the corporate employer of the person who is reading the document. A gold partner, represented by concept 534, is an entity or affiliate treated as any other member of the enterprise itself. A silver partner, represented by concept 532, has some favorable access to information. A default partner, represented by concept 536, has no formal relationship with the enterprise and is treated as a member of the general public. Examples of different partner levels include Guest, in which all information is available to the general public; Customer, which identifies an entity that has a contract with the enterprise; Partner, which identifies an entity having a preferred status with the enterprise; Reseller, which identifies an entity that sells products or services for the enterprise; Employee, which identifies an individual who is an employee or contractor to the enterprise. The content is expected to be different for partners at the different levels. These particular partner levels are all children of the "partner level" concept 530. Still other children concepts are defined in other embodiments.

Table 14 gives the entries in the relationship type table for the relationship depicted in FIG. 5 by connection 590. Table 15 gives the entries in the participant type table for the relationship depicted in FIG. 5 by connection 590.

TABLE 14

The "Has Info Object" Entries in Relationship Types Table

| Relationship Type Name | Description | Number of Participants | Creation Date |
| --- | --- | --- | --- |
| has_info_object | references content | 5 | Apr. 12, 2000 |

TABLE 15

The "Has Info Object" Entries in Participant Types Table

| Relationship Name | Role | Participant Type |
| --- | --- | --- |
| has_info_object | info_object | info_object |
| has_info_object | info_type | info_type |
| has_info_object | concept | Vocabulary |
| has_info_object | job_role | job_role |
| has_info_object | partner_level | partner_level |

The particular instance of the "has info object" relationship depicted in FIG. 5 specifies that a particular information object referenced by a particular information object 512 provides an "Introduction" info type about the BetaPerseus 2.0 product of interest to a person playing a marketing role for a silver level partner to the enterprise.

To manage a plurality of information objects, the IOR-C interface provides methods for defining the information object type, for setting the attributes of a concept of the information object type, for defining the "has info object" relationship type involving the information object type, and for setting the attributes of a particular relationship of the type.

5.3 Templates

Figure 6:
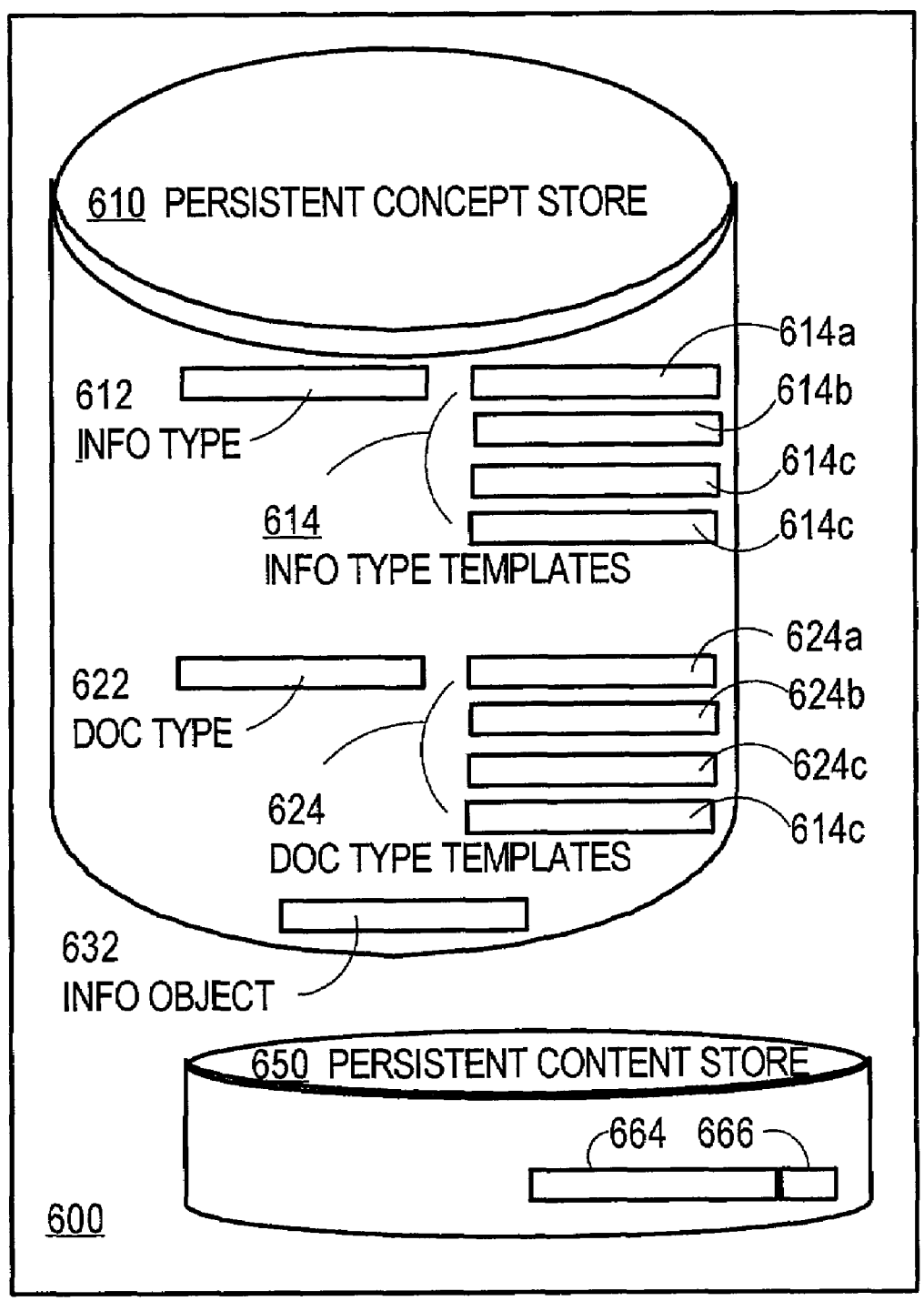
FIG. 6 is a block diagram illustrating data structures used in a system to produce electronic documents according to an embodiment.

FIG. 6 is a block diagram illustrating data structures used in a system 600 to produce electronic documents according to an embodiment. In this embodiment, an information object 664 is stored in a persistent content store 650 with a reference 666 used to retrieve the information object. Other information objects, not shown, are also stored in the persistent content store. A persistent concept store 610, such as a database of concepts and relationships, includes an information object 632 as a concept or relationship. An attribute of the information object 632 is the reference 666 for retrieving the information object 664. Other information objects, not shown, are also stored in the persistent content store or other source that can be referenced.

The persistent concept store also includes an information type 612 stored as a concept or relationship. Associated with the info type 612 are templates 614 for authoring and presenting the info type. Any method in the art may be used for associating the templates with the info types. For example, references to the templates are included as attributes of the concept or relationship representing the info type in the database. As another example, relationships are used in which the info type and the templates are participants. The templates are data structures configured to receive user input and may include data to use with the user input and to prompt for desired input. Any method in the art may be used to indicate how information should be entered. For example the template can be a hypertext markup language (HTML) page with a form for accepting text input or the file names of images or other data. As another example the template can be an extensible markup language (XML) document with a document type definition (DTD) describing the allowed entries.

For example, template 614a is an authoring template including data indicating how to produce an information object (content) for the info type. In some embodiments this data indicates the other information types included in the information type 612. In some embodiments this data includes user privileges for users authorized to generate the information object.

For example, template 614b is a printed page presentation template including data indicating how to present the information object on a printed page. Any method in the art may be used to indicate the presentation. For example, in one embodiment HTML tags are used to identify the position and fonts for text and the position and size of images. In another embodiment, an extensible stylesheet language (XSL) is used to format an XML document or transform the XML document to HTML or to some other presentation format.

Similarly, templates 614c and 614d are presentation templates for web pages and wireless devices. For example, in one embodiment HTML tags are used to identify the position and fonts for text, the position and size of images and video, and the order for audio data and computer programs. In another embodiment, an extensible stylesheet language (XSL) is used to format an XML document or transform the XML document to HTML or to some other presentation format, such as a wireless markup language (WML) for wireless devices.

In another example, the templates are a set of relationships to the Template Locations vocabulary, which is related to each template.

The persistent concept store also includes a document type 622 stored as a concept or relationship. Associated with the doc type 622 are templates 624 for authoring and presenting documents of the doc type. Any method in the art may be used for associating the templates with the doc types. For example, references to the templates are included as attributes of the concept or relationship representing the document type in the database. As another example, relationships are used in which the document type and the templates are participants.

For example, template 624a is an authoring template including data indicating how to produce a document of the document type. In some embodiments this data indicates the other information types included in the document type 612. In some embodiments this data includes user privileges for users authorized to generate documents of the document type.

For example, template 624b is a printed page presentation template including data indicating how to present the document on a printed page. The order and arrangement of information types are specified in this template. Any method in the art may be used to indicate the presentation. Similarly, templates 624c and 624d are presentation templates for web pages and wireless devices.

Using information types and templates, documents can be produced automatically that share the same information object 664 when useful and that present the information objects in a consistent way. For example, the presentation templates for the "Product Introduction" information type can indicate a larger font than the presentation templates for "Data Sheet Table" information type. Similarly, the presentation templates can tailor the information object for the output device. For example, the Data Sheet Table can be broken up and presented one row at a time on a wireless device according to the data in template 614d.

5.4 Multiple Layer IOR

Figure 7:
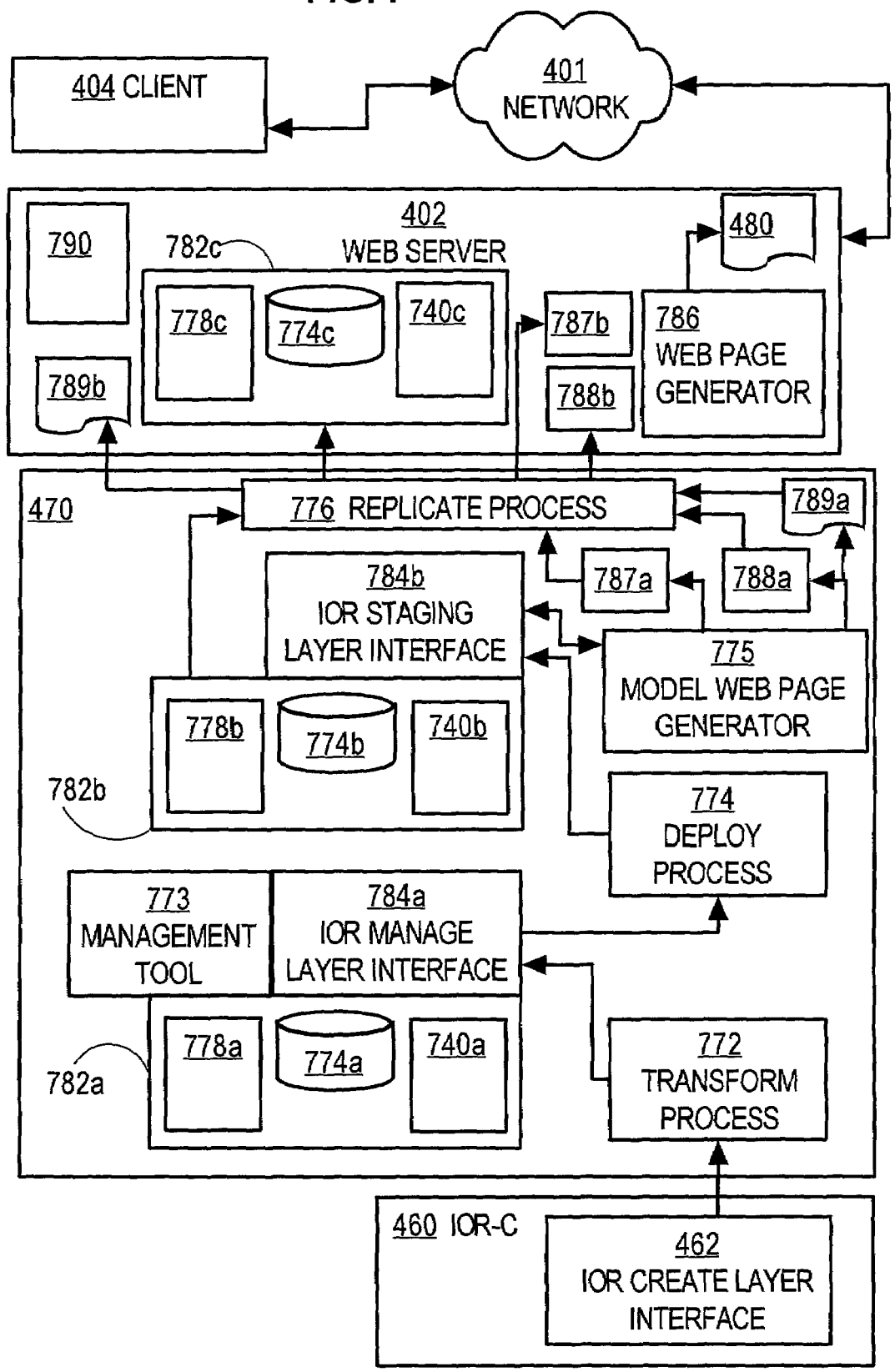
FIG. 7 is a block diagram illustrating a management layer, a staging layer, and a Web server layer of an information object repository according to one embodiment.

FIG. 7 is a block diagram illustrating an information object repository management layer 782a (IOR-M), a staging layer 782b (IOR-S), and a Web server layer 782c (IOR-F) of a multiple layer information object repository according to one embodiment. Such layers of the IOR are generated and used with IOR layer interfaces 784a, 784b, to support dynamic electronic document production based on the concepts and relationships in the VDS and the CMS.

Transform process 772 obtains information from the IOR-C layer 460 using the IOR-C layer interface 462 and generates the IOR-M layer 782a using the IOR-M layer interface 784a. The IOR-M layer 782a includes a content cache 778a, a concept cache 774a, and a concept cache server 740a. A management layer tool 773 also uses the IOR-M interface 784a to allow a user to view and edit the information objects, concepts and relationships in the IOR-M 782a.

The content cache is a data store that includes a subset of the information objects stored in the CMS of the IOR-C layer. Information objects that have become obsolete or that are not yet released are excluded from the content cache 778a. Also excluded are information objects that are not used by the electronic documents to be produced. This is an element of predictive caching to cache those objects expected to be used. Predictive caching is aided by information types that indicate the use of information objects. Some information objects of the CMS are combined into a single object in the content cache 778a, if doing so is expected to enhance efficiency of use. For example, information objects that are always used together in the documents to be produced, as determined by the templates, may be combined into a single information object in the content cache 778a. In some embodiments, the information objects carried over by the transform layer apply the formatting in the associated templates and are stored as formatted objects.

The information objects referring to the formatted objects are called formatted information objects. These actions can be triggered by events, usage, or other such algorithms.

The concept cache is a data store that includes a subset of the concepts and relationships stored in the concept database. The concept data from the concept database is denormalized in the concept cache to improve speed of retrieval by allowing a concept that participates in more than one relationship to be stored more than once in the concept cache. For example, an information type concept is stored with other information type concepts in the information type hierarchy and again with each document type that includes the information type. Thus, when a document is generated, a fill description of the information types is with the document type, reducing time needed to retrieve such data from the concept cache.

The management layer concept cache server 740a provides access to the concepts and relationships in the management layer concept cache 774a. The cache servers 740 in all the layers support the same methods provided by the concept access API (432 in FIG. 4A), but each cache server 740 operates on the concept cache 774 in the same layer.

The deploy process 774 obtains information from the IOR-M layer 782a using the IOR-M layer interface 784a and generates the IOR-S layer 782b using the IOR-S layer interface 784b. The IOR-S layer 782b includes a second content cache 778b, a second concept cache 774b, and a second concept cache server 740b. A quality assurance application, such as the model electronic document generator 775, uses the IOR-S interface 784b to allow a user to test the IOR-S layer 782b for its suitability for generating documents to be provided in a later stage. For example, the IOR-S layer is tested using the IOR-S interface 784b to ensure that all information objects in the content cache have an information object concept in the concept cache and that the information object concept has a relationship with at least an information type concept. As another example, authors use the IOR-S interface 784b to view the information objects and determine that the information is correct for the concepts to which the information objects are related by a corresponding information object.

A model electronic document generator 775 also uses the IOR-S interface 784b to allow a Web site developer to generate, view and edit the electronic documents to be provided by the Web server. In the course of operations the model electronic document generator 775 produces a search index 787a, a directory structure 788a for storing electronic documents produced, and static electronic documents 789a that do not depend on the user profile of the user viewing the page.

The replicate process 776 obtains information from the IOR-S layer 782b and reproduces it in a fast, Web server layer, IOR-F, 782c on each of one or more Web servers, such as Web server 402. The IOR-F layer 782c includes a third content cache 778c copied from the second content cache 778b, a third concept cache 774c copied from the second concept cache 774b, and a third concept cache server 740c. The search index 787a, directory structure 788a and static pages 789a are also replicated as search index 787b, directory structure 788b and static pages 789b, respectively, on each of the Web servers, such as Web server 402, and/or cache services that are available.

An electronic document generator 786 produces electronic documents 480 in response to requests from client 404. The electronic document generator 786 uses the search index 787b, the directory structure 788b, the static pages 789b, and the IOR-F layer 782c in any combination to produce the electronic documents 480. As described in more detail in the next section, when a user selects a concept with content that depends on the user profile, the electronic document generator uses the concept cache server 740c to determine information types in the electronic document type, and the information objects related to the information types for the selected concept. The electronic document generator then retrieves the information objects from the content cache using the URL reference from the information object.

Also shown on Web server 402 is a web application 790 that may be requested through the electronic documents 480.

In the following sections, the dynamic document production is described.

5.5 Electronic Document Production

FIG. 8A is a flow chart illustrating a high level method 810 for generating an electronic document according to one embodiment. The order shown is one embodiment for illustrative purposes. In other embodiments the steps may be performed simultaneously or in a different order.

In step 810, data indicating the information types used in various documents are generated and stored. These information types indicate how information objects associated with them are to be used. For example, information types include "Product Introduction," "Product Field Notice," and "Features and Benefits," "Product Small Photo," "Product large Photo," "Product Front Wireframe," "Product Rear Wireframe," "Data Sheet Table" and "Product MSRP," among others. An embodiment of step 810 is described in more detail below with reference to FIG. 8B.

In step 830, data indicating the document types are generated and stored. The document types are unique collections of information types used in the course of communicating information about an enterprise to its employees, partners, customers and marketplace. For example, document types include "Marketing Document," "Product Home Page," "Data Sheet," "Press Release," "Operator's Manual," "Product Overview" and "External Article," among others. A "Product Overview" document type includes a "Product Introduction" information type and a "Product Small Photo" information type. An embodiment of step 830 is described in more detail below with reference to FIG. 8C.

In step 850, units of information, called information objects, are stored and associated with an information type. For example, an image of the BetaPerseus 2.0 router is captured by a digital camera and stored using a format developed by the Joint Photographic Experts Group (JPEG) in a file named "bp20.jpg" in persistent content store 650 of FIG. 6. The JPEG file is then associated with the information type "Product Small Photo" in any manner in the art. An embodiment of step 850 is described in more detail below with reference to FIG. 8D.

In step 870, a document is produced based on a particular document type made up of a particular set of information types and based on a set of information objects associated with information types in the particular set of information types. In several embodiments, this step is performed by the electronic document generators such as the model web page generator 775 and the web page generator 786 in FIG. 7. For example a BetaPerseus 2.0 Overview Web Page is produced based on the "Product Overview" document type and a particular set of information objects associated with the "Product Introduction" and the "Product Small Photo" information types of the "Product Overview" document type. Because multiple information objects may be associated with the "Product Introduction" information type, the information object included in the particular set of information objects for the BetaPerseus 2.0 Overview Web Page is selected from the multiple information objects based on the values of one or more other attributes associated with the information object. For example, the selected information object is associated with a product having a name attribute of "BetaPerseus 2.0" and with a user having a role attribute of "marketing." An embodiment of step 870 is described in more detail below with reference to FIG. 8E and FIG. 8F.

In step 898 the information objects associated with the information types are changed. This can be done in any manner in the art. This is accomplished in one embodiment by replacing the contents in the file referenced by the information object. In another embodiment, this is accomplished by generating a new file with a new reference and storing the new reference in the information object already associated with an information type. Documents produced subsequently to this step, indicated by the arrow returning control to step 850, then present the new information object.

FIG. 8B is a flow chart illustrating details of embodiment 810' of step 810 in FIG. 8A for storing information types. In step 811, an information type is stored as a concept in the concept database with attributes such as a name and creation date. In another embodiment, an information type is stored as a relationship in the concept database. The order shown is one embodiment for illustrative purposes. In other embodiments the steps may be performed simultaneously or in a different order.

In step 813, an authoring template is stored which includes data indicating how to produce an information object for the particular information type, e.g., as attributes or relationships to other concepts used throughout the system. For example, the maximum number of pixels are specified for a Product Small Photo information type; and an author is prompted for information to use in the caption and to identify the product concepts and user concepts to which the information type is related. In some embodiments, the data also include a set of one or more user privileges, specifying the privileges of users who may author information objects for this information type. As described above, any method in the art may be used for associating the templates with the info types, such as attributes with a reference to the template, or relationships with the templates as participants.

In step 815, one or more presentation templates are stored which includes data indicating how to present an information object for the particular information type for various output devices. For example, an image for the Product Small Photo information type is converted to black and white image for a wireless device. For another example the Product Small Photo image is surrounded by a red border and the caption is placed on the lower border for presentation on a Web browser. In some embodiments, the data also include a set of one or more user privileges, specifying the privileges of users who may view information objects for this information type.

FIG. 8C is a flow chart illustrating details of embodiment 830' of step 830 in FIG. 8A for storing document types. The order shown is one embodiment for illustrative purposes. In other embodiments the steps may be performed simultaneously or in a different order.

In step 831, a document type is stored as a concept in the concept database with attributes such as a name and creation date. In another embodiment, a document type is stored as a relationship in the concept database.

In step 833, an authoring template is stored which includes data indicating how to produce a document of the particular document type. For example, the data indicates that a Product Overview document type includes a Product Introduction information type and a Product Small Photo information type. In some embodiments, the template also indicates whether an information type is primary, required or optional. A primary information type is the main focus for a document, therefore the document of this type is not allowed to exist if this information type is missing. For example, the Product Introduction is a primary information type for the Product Overview document type. A required information type is one that is included before a document is finished for presentation to a user. For example, an author may view a document in which a required information type is missing, but not a user. Such a document is not presented to a user. A document may be produced and presented even if an optional information type is missing. For example, the Product Small Photo is an optional information type for the documents of the Product Overview document type.

The relationships with the authoring template may define prompts for requesting an author to input a subject for the document, such as the product service or activity to be described, and the user role of the person to whom the document is presented. In some embodiments, the data also include a set of one or more user privileges, specifying the privileges of users who may author information objects for this information type. As described above, any method in the art may be used for associating the templates with the info types, such as attributes or relationships with a reference to the template, or relationships with the templates as participants.

In step 835, one or more presentation templates are stored which include data indicating how to present a document of the particular document type for various output devices. For example, the Product Introduction information type is presented before the Product Small Photo information type for a wireless device. For another example the Product Small Photo image, surrounded by its red border and the caption, is placed to the right of a text box with the Product Introduction on the Web page. In some embodiments, the data also include a set of one or more user privileges, specifying the privileges of users who may view documents of this document type.

In step 837, the information types are associated with the document types as one or more relationships stored in the concept database, with the document type and information type as participant concepts in each relationship. An attribute of the relationship includes the value "primary," "required" or "optional," and may include many other relationship participants or attributes.

Figure 8D:
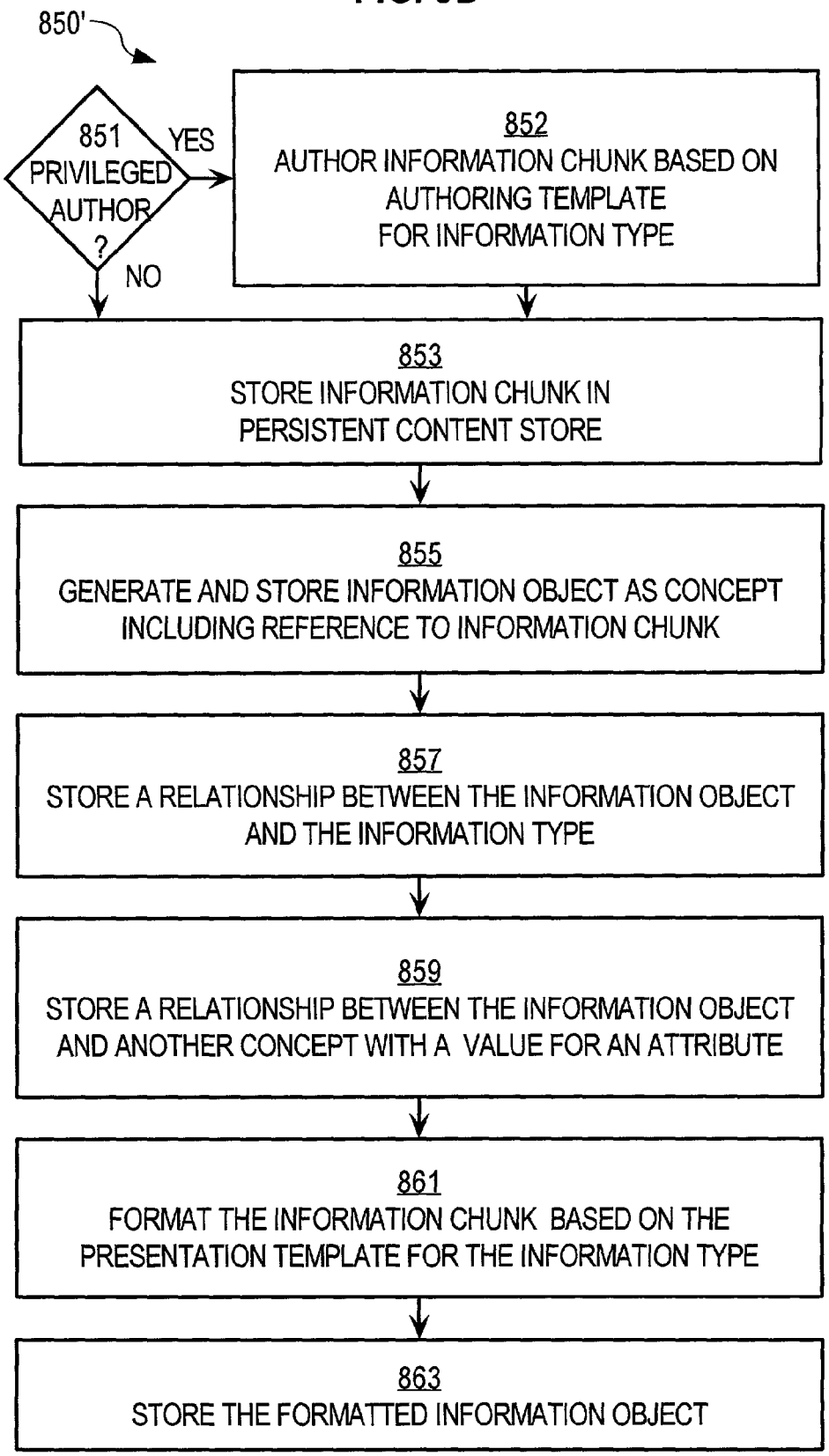

FIG. 8D is a flow chart illustrating details of embodiment 850' of step 850 in FIG. 8A for storing information objects. The order shown is one embodiment for illustrative purposes. In other embodiments the steps may be performed simultaneously or in a different order.

In step 851, it is determined whether a user is a privileged author for generating information objects for a particular information type. If so, control passes to step 852 to author an information object based on the authoring template. If not, control passes to step 853 to store the information object in the persistent content store 650 of FIG. 6. For example, in step 852, a privileged user authors an Introduction for the BetaPerseus 2.0 for use by a person playing a marketing role for a silver partner. In step 853 the introduction is stored in a file Intro777.html. As another example, a BetaPerseus 2.0 image is stored in file bp20.jpg in step 853.

In step 855, an information object is generated and stored in the database as a concept. The information object includes data indicating the reference to the information object in the persistent store, such as a database record number or a file name. For example an information object X is generated for the BetaPerseus 2.0 image information object, and stored in the database; info object X includes data indicating reference "bp20.jpg." Another information object Y is generated for the BetaPerseus 2.0 Introduction information object, and stored in the database; info object Y includes data indicating reference "Intro777.html."

In step 857 a relationship is generated and stored in which the information object and an information type are participants. For example a relationship 590 in FIG. 5, of the "has info object" relationship type, is generated and stored with info object Y and information type "Product Introduction" as participants, as shown in FIG. 5.

In step 859, a relationship is stored with the information object Y and zero, one or more other concepts as participants. Either the relationship or at least one of the other concepts has a particular value for a certain attribute used to identify the information object as one of interest for a particular document. For example, the info object Y is related to the concept for BetaPerseus 2.0 by the relationship 590 in FIG. 5, because the corresponding information object was produced for that product. The concept BetaPerseus 2.0 has a name attribute with the value "BetaPerseus 2.0." This relationship 590 identifies info object Y as an info object related to the product BetaPerseus 2.0. In one embodiment, the relationship is the same relationship that has the information type as a participant. For example relationship 590 depicted in FIG. 5 includes both the information type "Product Introduction" and the product "BetaPerseus 2.0" as participants. In other embodiments one or more separate relationships have the info object Y and the other concepts as participants. In the depicted embodiment, the relationship 590 also includes the marketing role and the silver partner level as participants. These concepts have name attributes with values of "marketing role" and "silver partner," respectively. In other embodiments, a product or a user role or a partner level or some combination is an attribute of the relationship itself rather than an attribute of a concept that is a participant. Step 859 allows the document production process to distinguish, based on the values of one or more attributes, among several information objects that are associated with the same information type.

In step 861, the information object is formatted based on the presentation template for the information type. In step 863, the formatted information object is stored in the persistent content store at a new location indicated by a new reference; and the information object is updated to include the new reference. When an information object references an information object that has been formatted according to a presentation template, the information object is called a formatted information object. Steps 861 and 863 sometimes improve performance and/or assist in presentation processing for certain data storage mediums, e.g., CD-ROM distribution. For example, if a particular information object is repeatedly used in many documents on the same output device, then performance may improve if the information object is formatted and stored once and repeatedly retrieved in already formatted condition. In some embodiments, steps 861 and 863 are not performed.

Figure 8E:
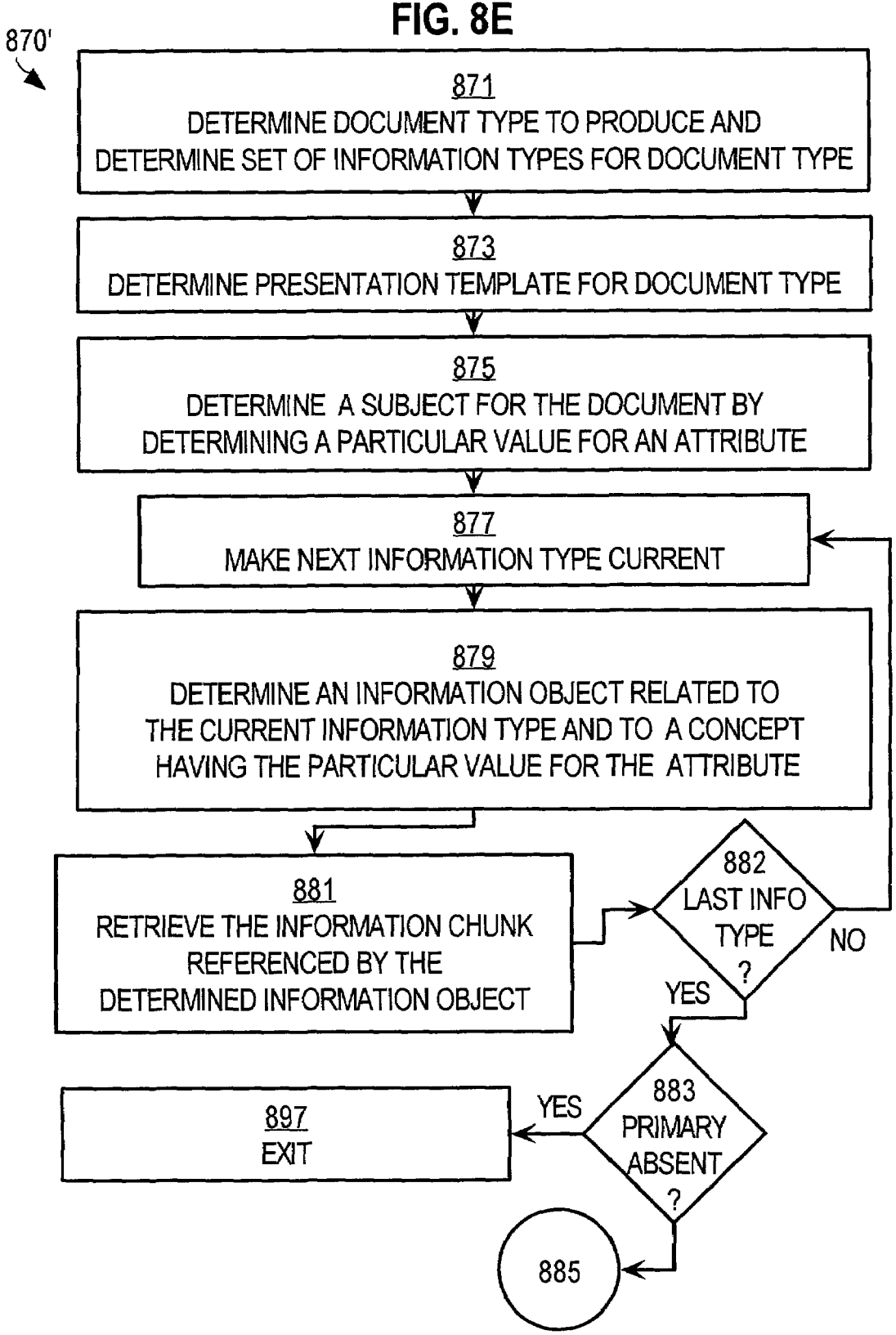
Figure 8F:
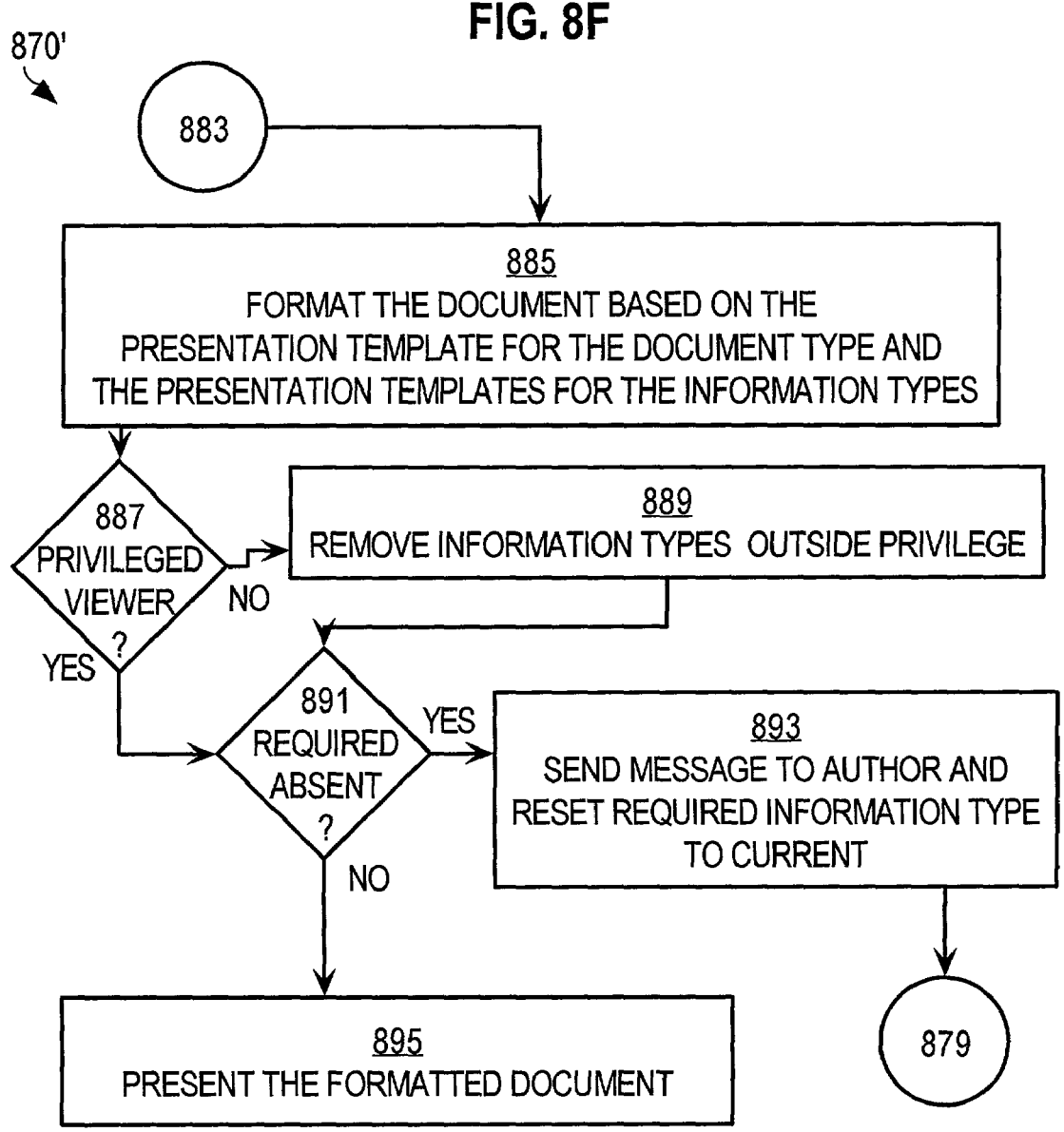

FIG. 8E and FIG. 8F combine to form a flow chart illustrating details of embodiment 870' of step 870 in FIG. 8A for producing a document. The order shown is one embodiment for illustrative purposes. In other embodiments the steps may be performed simultaneously or in a different order.

In step 871 a document type is determined for the document to be produced. Any method for determining the document type can be used. For example, a user requests a document of the "Product Overview" document type by selecting "Product Overview" from a pull down menu. Based on this selection, the document production process determines the information types for the selected document type. For example, the document production process determines from the relationships involving the Product Overview document type, that the information types Product Introduction and Product Small Photo are included.

In step 873, the presentation template for the document type is determined. Any method for determining the presentation template can be used. For example, the document production process determines from the context of the user's request that the document is to be produced for a web page. A relationship with the Product Overview document type is found having a reference to a template as a value for a web page presentation template attribute. The presentation template indicates the Introduction is placed to the left of the Product Small Photo.

In step 875 a subject for the document is determined based on determining that a particular set of one or more attributes should have specified values. For example, the user profile indicates the user fills a marketing role for a silver partner; and the user request for the document type includes data indicating the product to be overviewed is the BetaPerseus 2.0. Thus the subject of the document is determined to be the "BetaPerseus 2.0" value for the product name, and, if different documents are produced based on the user profiled, the subject is defined by the marketing role of a silver partner.

Step 877 starts a loop through the information types of the document type for the document being produced. The next information type of the document type is made the current information type. The first time step 877 is encountered, the first information type is made the current information type. For example, the Product Introduction is made the current information type.

In step 879, the information object is found that is related to the current information type and to concepts or relationships with the particular values of the attributes determined in step 875. For example, several relationships of the "has info object" type are found with a product attribute value of "BetaPerseus 2.0" and an information type of "Product Introduction." The user profile is employed to determine that only one relationship, relationship 590 in FIG. 5, has a user role and partner level that matches the user profile of the requesting user. The information object of relationship 590, here called info object Y, is determined to be the information object for the document being produced.

In step 881, the information object referenced by the determined information object is retrieved. For example, the information object at Intro777.html is retrieved. If no information object applies to the subject and user profile, no information object is retrieved for the current information type.

Step 882 represents a decision point for determining whether the loop over the information types is complete. If not, control passes to step 877 to make the next information type the current information type. For example, the Product Small Photo is made the next information type. The use of specific relationships that are specifically designed to determine if a particular document page is built can also assist this, in another embodiment.

When the last information type has had its information object, if any, retrieved, control passes to step 883. In step 883, it is determined whether a primary information type is absent. For example, it is determined in step 883 whether the Product Introduction, primary for the Product Overview document type, is absent. If so, control passes to step 897 to exit the document production process. The document does not exist to be produced.

If an information object for the primary information type is not absent, control passes to step 885, depicted in FIG. 8F. In step 885, the information objects are formatted according to their presentation templates, unless already formatted in steps 861 and 863 in FIG. 8D. Also in step 885, the document is formatted according to the presentation template for the document type and output device. For example, the BetaPerseus 2.0 Product Overview document is formatted according to the template for the Product Overview document type for a Web page. In this example, the Product Introduction is placed on the left of the page and the Product Small Photo is placed on the right, inside a red border with the picture caption in the lower border.

In step 887, it is determined whether the user is a privileged viewer for all the information types in the document. If not, control passes to step 889 to remove the information objects for information types the user is not privileged to view.

In step 891, it is determined whether a required information type is absent. If so, control passes to step 893 to send a message to an author of the document to provide the required information type. The absent but required information type is made the current information type and control passes back to step 879 in FIG. 8E to determine the information object related to the information type.

If no required information types are absent, control passes to step 895 to present the formatted document to the user on the output device.

Using these steps, information objects are automatically reused in all documents based on the information type describing the use of the information, the subject of the document, and the user profile. In addition, the document is automatically formatted for the output device on which the document is presented.

The capabilities provided by these steps allow predictive caching to be employed. Because content is associated with a use through the information type concepts, the information objects associated with the most common uses, and with a particular active user for output to the particular device employed by the user, can be moved to a cache before specifically requested by the document production process. Then when the process does request the particular information object, it is likely already in cache. This reduces or eliminates the delays caused by retrieving data from a persistent store.

Thus, the ability to create predictive caching technologies is provided. Caching decisions may be carried out, for example, based on relationships, network infrastructure, or other priority mechanisms. Using the disclosed structure, for example, a Japanese partner who is accessing information from Tokyo experiences different caching and delivery behavior because of the partner's location with respect to the caches, service agreement, language, and other partner details (e.g., kind of product, tools used, bookmarks, etc.).

6.0 Hardware Overview

Figure 9:
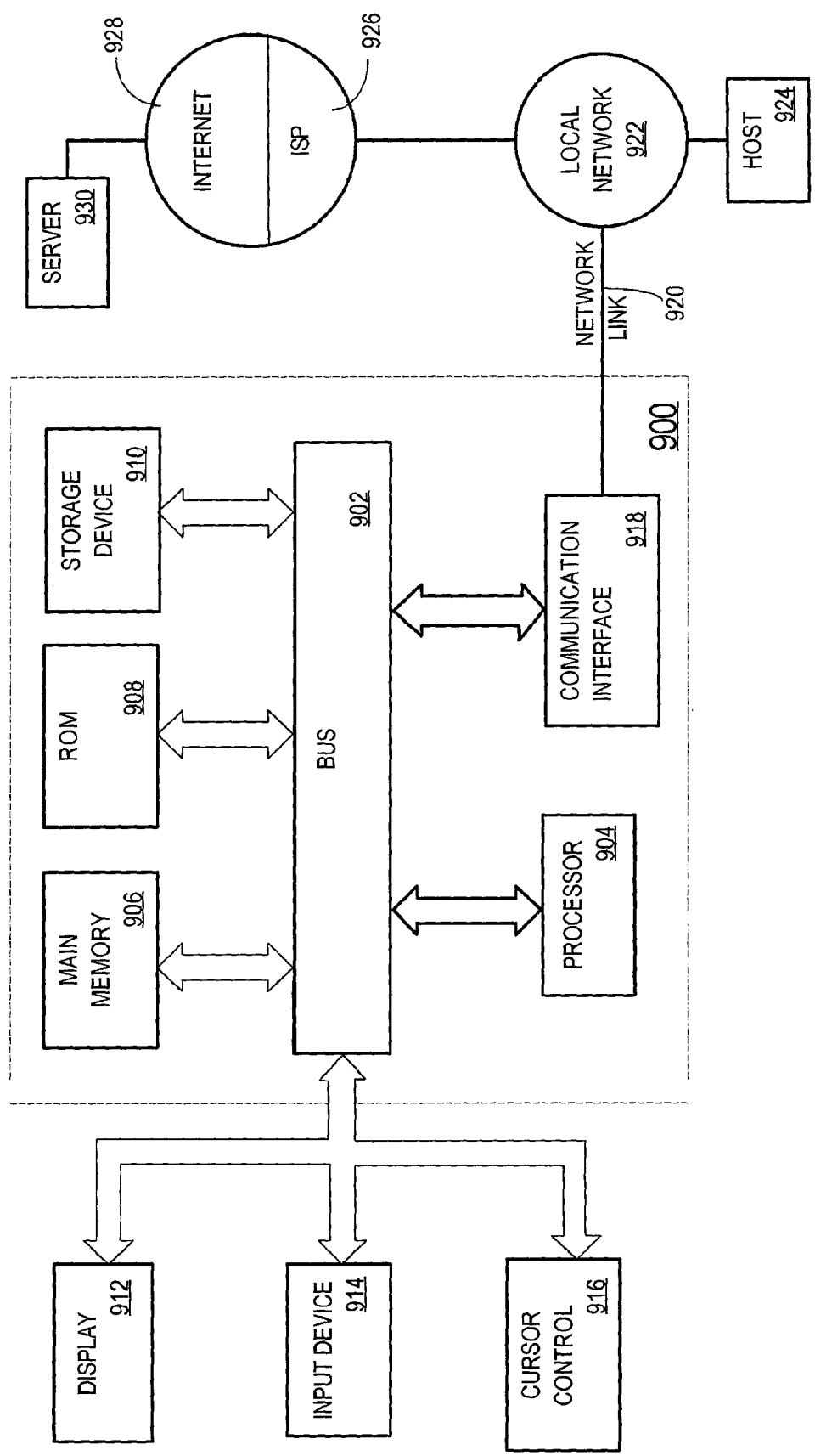
FIG. 9 is a block diagram that illustrates a computer system upon which an embodiment may be implemented.

FIG. 9 is a block diagram that illustrates a computer system 900 upon which an embodiment of the invention may be implemented. Computer system 900 includes a bus 902 or other communication mechanism for communicating information, and a processor 904 coupled with bus 902 for processing information. Computer system 900 also includes a main memory 906, such as a random access memory ("RAM") or other dynamic storage device, coupled to bus 902 for storing information and instructions to be executed by processor 904. Main memory 906 also may be used for storing temporary variables or other intermediate information during execution of instructions to be executed by processor 904. Computer system 900 further includes a read only memory ("ROM") 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube ("CRT"), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

The invention is related to the use of computer system 900 for producing electronic documents. According to one embodiment of the invention, a document production application is provided by computer system 900 in response to processor 904 executing one or more sequences of one or more instructions contained in main memory 906. Such instructions may be read into main memory 906 from another computer-readable medium, such as storage device 910. Execution of the sequences of instructions contained in main memory 906 causes processor 904 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 904 for execution. Such a medium may take many forms, including but not limited to, non-volatile media, volatile media, and transmission media. Non-volatile media includes, for example, optical or magnetic disks, such as storage device 910. Volatile media includes dynamic memory, such as main memory 906. Transmission media includes coaxial cables, copper wire and fiber optics, including the wires that comprise bus 902. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 904 for execution. For example, the instructions may initially be carried on a magnetic disk of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network ("ISDN") card or a modem to provide a data communication connection to a corresponding type of telephone line. As another example, communication interface 918 may be a local area network ("LAN") card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider ("ISP") 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are exemplary forms of carrier waves transporting the information.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918. In accordance with the invention, one such downloaded application provides for a document production application as described herein.

The received code may be executed by processor 904 as it is received, and/or stored in storage device 910, or other non-volatile storage for later execution. In this manner, computer system 900 may obtain application code in the form of a carrier wave.

7.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of forming electronic documents, the method comprising the computer implemented steps of:
   storing a plurality of information types for describing categories of information that are capable of being used in electronic documents;
   storing a plurality of document types, each document type comprising a unique set of information types of the plurality of information types;
   storing a plurality of units of information, each unit of information associated with an information type of the plurality of information types, wherein each unit of information of the plurality of units of information includes any of any form of markup text, an application program, a Web service, a query for a database, a vector graphic, an image, audio data, video data, and other binary data; and
   producing a document based on integrating
      a particular document type comprising a particular set of information types, wherein the particular document type includes first data indicating a first information type of the particular set of information types as a primary information type,
      a first set of units of information, each unit of information of the first set associated with a corresponding information type in the particular set of information types, wherein each unit of information of the first set is among the plurality of units of information, and
      one or more n-ary relationships that express the particular document type and the first set of units of information,
   wherein said step of producing the document is not performed until the first set of units of information includes a first unit of information associated with the first information type.

2. A method as recited in claim 1, said step of producing the document comprising the steps of
   determining the particular set of information types of the particular document type;
   determining the first set of units of information; and
   presenting the first set of units of information.

3. A method as recited in claim 2, wherein:
   said step of storing a plurality of information types comprises storing a particular data structure associated with a particular information type of the plurality of information types, the particular data structure including first data comprising a plurality of relationships and attributes indicating how to present a unit of information associated with the particular information type; and
   said step of presenting the first set of units of information comprises presenting a particular unit of information associated with the particular information type in the first set based at least in part on the first data.

4. A method as recited in claim 3, wherein,
   the first data indicates a user privilege for viewing information; and
   said step of producing the document includes limiting said presenting the particular unit of information associated with the particular information type in the first set to a user associated with the user privilege for viewing information.

5. A method as recited in claim 3, further comprising formatting the particular unit of information associated with the particular information type in the first set based at least in part on the first data before said step of producing the document.

6. A method as recited in claim 2, wherein:
said step of storing a plurality of document types comprises storing a particular data structure associated with a particular document type of the plurality of document types, the particular data structure including first data indicating how to present the unique set of information types of the particular document type; and
said step of presenting the first set of units of information comprises presenting the first set of units of information based on the first data.

7. A method of claim 2, wherein:
said step of storing a plurality of units of information further comprises associating each unit of information with a corresponding value for a first attribute;
said step of producing the document further comprises determining a particular value for the first attribute; and
said step of determining the first set of units of information further comprises determining whether each unit of information is associated with the particular value for the first attribute.

8. A method as recited in claim 1, wherein the plurality of information types include at least one of a product introduction information type, a product field notice information type, a product features and benefits information type, a product image information type, a product schematic drawing information type, a product operational properties information type, a product data sheet table, and an external article section information type.

9. A method as recited in claim 1, wherein a first information type of the plurality of information types comprises at least one other information type of the plurality of information types.

10. A method as recited in claim 1, wherein:
said step of storing a plurality of information types comprises storing a particular data structure associated with a particular information type of the plurality of information types, the particular data structure including first data indicating how to produce information for the particular information type; and
said step of storing a plurality of units of information includes producing information for the particular information type based at least in part on the first data.

11. A method as recited in claim 10, wherein the particular data structure comprises information describing one or more relationship types, roles, attributes, orders, or participants.

12. A method as recited in claim 10, wherein:
the first data indicates a user privilege for authoring information; and
said step of storing a plurality of units of information includes limiting said producing information for the particular information type to a user associated with the user privilege or profile for authoring information.

13. A method of claim 1, wherein:
the particular document type includes first data indicating a first information type of the particular set of information types as a required information type; and
said step of producing the document of the particular document type is not completed until the first set of units of information includes a first unit of information associated with the first information type.

14. A method of claim 1, wherein:
the particular document type includes first data indicating a first information type of the particular set of information types as an optional information type; and
said step of producing the document of the particular document type is completed even if the first set of units of information does not include a first unit of information associated with the first information type.

15. A method of claim 1, wherein the plurality of information types and the plurality of document types are stored in a database of concepts and n-dimensional relationships among concepts.

16. A method of claim 1, the step of storing the plurality of units of information further comprising storing a reference to each unit of information in an information object stored in the database of concepts and relationships.

17. A method of claim 1, wherein:
the plurality of information types are stored as concepts in the database;
the plurality of documents types are stored as concepts in the database; and
the unique set of information types for each document type is stored as a set of relationships between the document type and the information types in the unique set.

18. A method of claim 17, wherein:
the particular unit of information referenced by the particular information object is in the first set of units of information for the document; and
the method further comprises the step of updating the document by storing a different reference to a different unit of information in the particular information object.

19. A method of claim 1, wherein the step of storing the plurality of units of information further comprises:
including a reference to a particular unit of information in a particular information object;
storing the particular information object as a concept in the database; and
storing in the database a particular relationship between the particular information object and a particular information type of the plurality of information types.

20. A method of claim 1, wherein:
the step of storing the plurality of units of information further comprises including a reference to a particular unit of information in a particular information object, and
storing the particular information object as a particular relationship in the database;
and the particular relationship indicates a particular information type of the plurality of relationship types.

21. A method of claim 20, wherein the first attribute is a product name.

22. A method of claim 20, wherein the first attribute is a characteristic of a user of the document.

23. A method of claim 22, wherein the characteristic is a job role of the user.

24. A method of claim 22, wherein the characteristic is a partner level of the user.

25. A method of claim 22, wherein the characteristic is a language in which the document is capable of being expressed.

26. A method of claim 22, wherein the characteristic is a task that the user is trying to complete.

27. A method of claim 22, wherein the characteristic is a product history.

28. A method of claim 20, wherein the step of associating each unit of information with a corresponding value for a first attribute further comprises:
including a reference to a particular unit of information in a particular information object;

storing the particular information object as a concept in a database of concepts and relationships; and associating the particular information object with the corresponding value for the first attribute.

29. A method of claim 28, wherein the step of associating the particular information object with the corresponding value for the first attribute further comprises storing in the database a particular relationship between the particular information object and a particular concept having the corresponding value for the first attribute.

30. A method of claim 28, wherein the step of associating the particular information object with the corresponding value for the first attribute further comprises storing in the database a particular relationship having the corresponding value for the first attribute and having the particular information object as a participant in the relationship.

31. A method of claim 1, further comprising the step of updating the document by changing content in a first unit of information in the first set of units of information.

32. A computer-readable medium carrying one or more sequences of instructions for forming electronic documents, which instructions, when executed by one or more processors, cause the one or more processors to carry out the steps of:

storing a plurality of information types for describing categories of information that are capable of being used in electronic documents;

storing a plurality of document types, each document type comprising a unique set of information types of the plurality of information types;

storing a plurality of units of information, each unit of information associated with an information type of the plurality of information types, wherein each unit of information of the plurality of units of information includes any of any form of markup text, an application program, a Web service, a query for a database, a vector graphic, an image, audio data, video data, and other binary data; and producing a document based on integrating a particular document type comprising a particular set of information types, wherein the particular document type includes first data indicating a first information type of the particular set of information types as a primary information type, a first set of units of information, each unit of information of the first set associated with a corresponding information type in the particular set of information types, wherein each unit of information of the first set is among the plurality of units of information, and one or more n-ary relationships that express the particular document type and the first set of units of information, wherein said step of producing the document is not performed until the first set of units of information includes a first unit of information associated with the first information type.

33. A system for forming electronic documents, comprising:

a means for storing a plurality of information types for describing categories of information that are capable of being used in electronic documents;

a means for storing a plurality of document types, each document type comprising a unique set of information types of the plurality of information types;

a means for storing a plurality of units of information, each unit of information associated with an information type of the plurality of information types, wherein each unit of information of the plurality of units of information includes any of any form of markup text, an application program, a Web service, a query for a database, a vector graphic, an image, audio data, video data, and other binary data; and a means for producing a document based on integrating a particular document type comprising a particular set of information types, wherein the particular document type includes first data indicating a first information type of the particular set of information types as a primary information type, a first set of units of information, each unit of information of the first set associated with a corresponding information type in the particular set of information types, wherein each unit of information of the first set is among the plurality of units of information, and one or more n-ary relationships that express the particular document type and the first set of units of information, wherein the document is not produced until the first set of units of information includes a first unit of information associated with the first information type.

34. A system for forming electronic documents, comprising:

a computer-readable medium carrying:

a plurality of information types for describing categories of information that are capable of being used in electronic documents;

a plurality of document types, each document type comprising a unique set of information types of the plurality of information types; and a plurality of units of information, each unit of information associated with an information type of the plurality of information types, wherein each unit of information of the plurality of units of information includes any of any form of markup text, an application program, a Web service, a query for a database, a vector graphic, an image, audio data, video data, and other binary data; and one or more processors configured to perform the step of producing a document based on integrating a particular document type comprising a particular set of information types, wherein the particular document type includes first data indicating a first information type of the particular set of information types as a primary information type, a first set of units of information, each unit of information of the first set associated with a corresponding information type in the particular set of information types, wherein each unit of information of the first set is among the plurality of units of information, and one or more n-ary relationships that express the particular document type and the first set of units of information, wherein the document is not produced until the first set of units of information includes a first unit of information associated with the first information type.

* * * * *

UNITED STATES PATENT AND TRADEMARK OFFICE
CERTIFICATE OF CORRECTION

PATENT NO. : 7,062,705 B1  Page 1 of 1
APPLICATION NO. : 09/909108
DATED : June 13, 2006
INVENTOR(S) : Michael J. Kirkwood et al.

It is certified that error appears in the above-identified patent and that said Letters Patent is hereby corrected as shown below:

Title page, item (75) Inventors:

Delete "Sima Yazdani, Fremont" and insert --Sima Yardani, Pleasanton--.

Column 36
Claim 2: Line 39, delete "steps of" and insert --steps of:--.

Signed and Sealed this

Twelfth Day of June, 2007

JON W. DUDAS
*Director of the United States Patent and Trademark Office*